United States Patent
Okano et al.

(10) Patent No.: US 9,566,971 B2
(45) Date of Patent: Feb. 14, 2017

(54) HYDRAULIC-PRESSURE PRODUCING DEVICE AND HYDRAULIC BRAKE SYSTEM

(75) Inventors: Takahiro Okano, Toyota (JP); Yusuke Kamiya, Okazaki (JP); Kiyoyuki Uchida, Konan (JP); Akira Sakai, Toyota (JP); Hiroshi Ueno, Toyota (JP); Masaaki Uechi, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 254 days.

(21) Appl. No.: 14/125,752

(22) PCT Filed: Oct. 25, 2011

(86) PCT No.: PCT/JP2011/074521
§ 371 (c)(1),
(2), (4) Date: Jan. 6, 2014

(87) PCT Pub. No.: WO2012/172702
PCT Pub. Date: Dec. 20, 2012

(65) Prior Publication Data
US 2014/0210253 A1    Jul. 31, 2014

(30) Foreign Application Priority Data
Jun. 13, 2011   (JP) ................ 2011-131003

(51) Int. Cl.
| | | |
|---|---|---|
| *B60T 8/88* | (2006.01) | |
| *B60T 17/22* | (2006.01) | |
| *B60T 13/14* | (2006.01) | |
| *B60T 13/58* | (2006.01) | |
| *B60T 11/16* | (2006.01) | |
| *B60T 11/20* | (2006.01) | |
| *B60T 7/04* | (2006.01) | |
| *B60T 13/74* | (2006.01) | |

(52) U.S. Cl.
CPC ........... *B60T 17/22* (2013.01); *B60T 7/042* (2013.01); *B60T 8/885* (2013.01); *B60T 11/16* (2013.01);
(Continued)

(58) Field of Classification Search
CPC ......... B60T 8/4081; B60T 8/88; B60T 8/885; B60T 8/92; B60T 13/745; B60T 7/042; B60T 11/16; B60T 11/20; B60T 13/146; B60T 13/585; B60T 17/22; B60T 17/221
(Continued)

(56) References Cited

U.S. PATENT DOCUMENTS 5,868,473 A *   2/1999   Kato ................ B60T 8/885
                                      303/122.09
6,132,012 A *  10/2000   Ishii ................ B60T 8/4036
                                      303/122.09
(Continued)

FOREIGN PATENT DOCUMENTS

DE   3232051 A    3/1984
DE   3418042 A1   11/1985
(Continued)

OTHER PUBLICATIONS

International Search Report issued Jan. 31, 2012 in PCT/JP2011/074521.

*Primary Examiner* — Melody Burch
(74) *Attorney, Agent, or Firm* — Oblon, McClelland, Maier & Neustadt, L.L.P.

(57) ABSTRACT

In a hydraulic brake system including a cylinder device that includes a front chamber and a rear chamber located on front and rear sides of a pressurizing piston, respectively, presence or absence of liquid leakage from a brake line is detected based on a hydraulic pressure in the rear chamber. Where a
(Continued)

state in which a subtraction value obtained by subtracting an actual rear hydraulic pressure from a target rear hydraulic pressure is larger than a first malfunction determination threshold value has continued for a time not shorter than a first malfunction determination time, and then an increase of the actual rear hydraulic pressure at a rate not lower than a set rate has caused the subtraction value to become smaller than a return determination threshold value, it is determined that the pressurizing piston has been bottomed due to liquid leakage from the front chamber.

14 Claims, 14 Drawing Sheets

(52) U.S. Cl.
CPC .............. B60T 11/20 (2013.01); B60T 13/146 (2013.01); B60T 13/585 (2013.01); B60T 17/221 (2013.01)

(58) Field of Classification Search
USPC ......... 303/122, 122.09, 122.13; 60/534, 535, 60/582, 591, 403
See application file for complete search history.

(56) References Cited

U.S. PATENT DOCUMENTS

| | | | |
|---|---|---|---|
| 6,158,822 A * | 12/2000 | Shirai | B60T 13/74 188/1.11 L |
| 6,382,737 B1 * | 5/2002 | Isono | B60T 13/163 188/358 |
| 2002/0043875 A1 | 4/2002 | Braun | |
| 2003/0020327 A1 * | 1/2003 | Isono | B60T 8/4081 303/113.4 |
| 2003/0020328 A1 | 1/2003 | Kusano et al. | |
| 2008/0246335 A1 * | 10/2008 | Spieker | B60T 8/885 303/122.08 |
| 2009/0045672 A1 * | 2/2009 | Nishino | B60T 7/042 303/113.3 |
| 2009/0230761 A1 * | 9/2009 | Sekiguchi | B60T 8/442 303/2 |
| 2012/0144822 A1 | 6/2012 | Isono | |

FOREIGN PATENT DOCUMENTS

| | | |
|---|---|---|
| DE | 3817178 A1 | 11/1989 |
| DE | 10233196 A1 | 2/2003 |
| JP | 08-268245 A | 10/1996 |
| JP | 11-286272 A | 10/1999 |
| JP | 2000-095075 A | 4/2000 |
| JP | 2000-118388 A | 4/2000 |
| JP | 2002-234427 A | 8/2002 |
| JP | 2002-331925 A | 11/2002 |
| JP | 2003-025983 A | 1/2003 |
| JP | 2004-237815 A | 8/2004 |
| JP | 2011-051400 A | 3/2011 |
| WO | WO 2007/012948 A1 | 2/2007 |

* cited by examiner

FIG.3
(a)
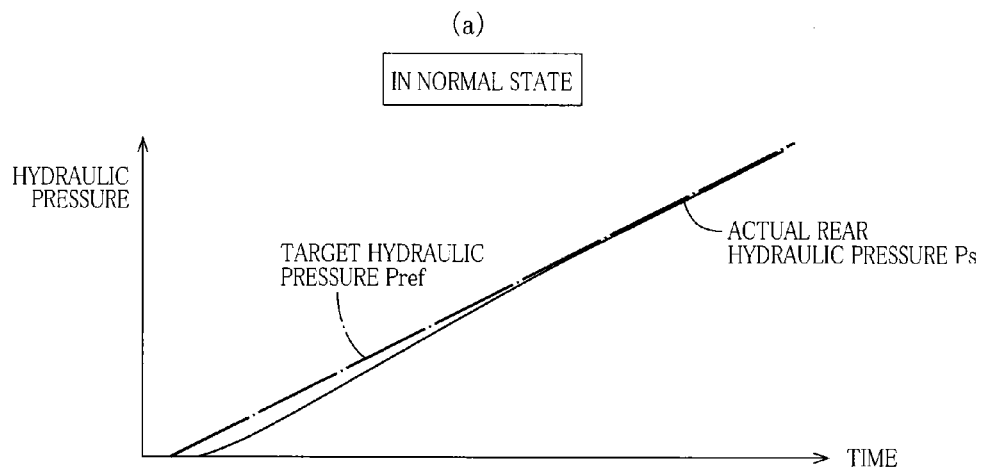
(b)
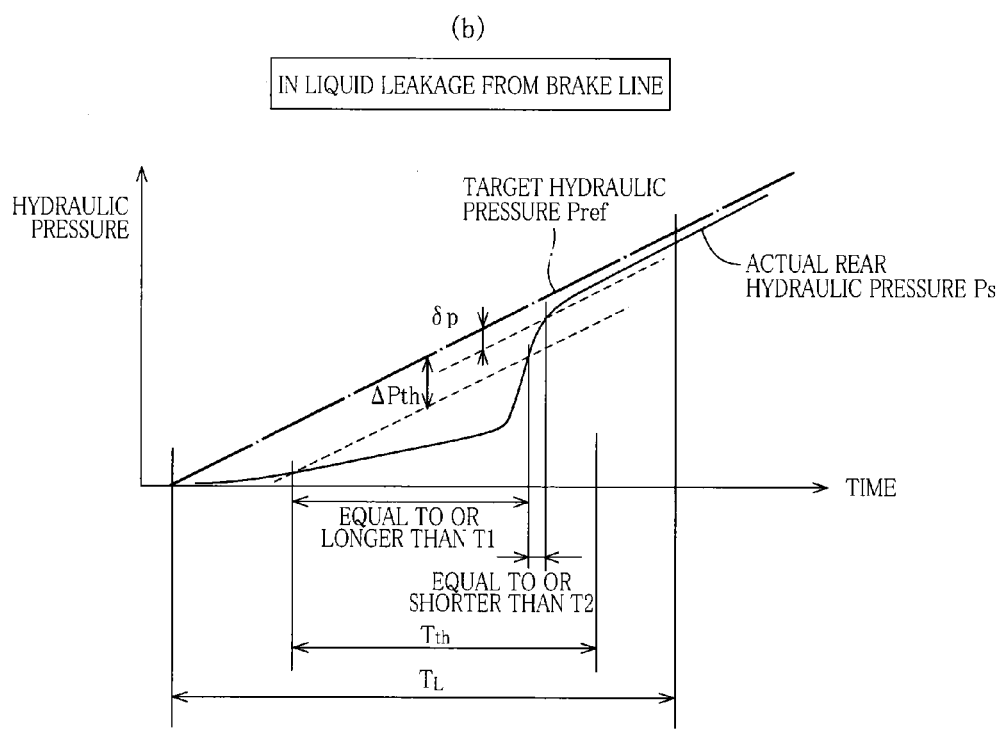

HYDRAULIC-PRESSURE PRODUCING DEVICE AND HYDRAULIC BRAKE SYSTEM

TECHNICAL FIELD

The present invention relates to detection of a malfunction in a hydraulic-pressure producing device and a hydraulic brake system.

BACKGROUND ART

Patent Document 1 discloses a hydraulic brake system including (a) a master cylinder including a pressurizing piston coupled to a brake pedal and designed to generate a hydraulic pressure related to a brake operating force, in a front chamber located in front of the pressurizing piston, (b) a master-cylinder-pressure sensor for detecting a hydraulic pressure in the front chamber, (c) a foot power sensor for detecting a foot power applied to the brake pedal, and (d) a liquid leakage detector configured to detect that there is a liquid leakage from a hydraulic pipe line for coupling a pressure chamber and a brake cylinder to each other, in a case where a value detected by the master-cylinder-pressure sensor is small when compared with a hydraulic pressure in the front chamber which is estimated based on a value detected by the foot power sensor.

Patent Document 2 discloses a hydraulic brake system including (1) a power hydraulic pressure source designed to produce a hydraulic pressure by a supply of electric power, (ii) a pressure-buildup linear valve provided between the power hydraulic pressure source and a brake cylinder, (iii) a pressure-reduction linear valve provided between the brake cylinder and a reservoir, and (iv) a liquid-leakage detection device designed to detect presence or absence of the liquid leakage from each of the pressure-buildup linear valve and the pressure-reduction linear valve based on a change in a hydraulic pressure in the brake cylinder in a state in which currents supplied to solenoids of the pressure-buildup linear valve and the pressure-reduction linear valve are controlled such that the pressure-buildup linear valve and the pressure-reduction linear valve are in their respective closed states.

Patent Document 3 discloses a hydraulic brake system including: a master cylinder; a brake cylinder coupled to a pressure chamber located in front of a pressurizing piston; and a master-cylinder-pressure sensor for detecting a hydraulic pressure in the pressure chamber of the master cylinder.

PRIOR ART DOCUMENTS

Patent Documents

Patent Document 1: JP-A-2000-95075
Patent Document 2: JP-A-2004-237815
Patent Document 3: JP-A-8-268245

SUMMARY OF THE INVENTION

Problem to be Solved by the Invention

The problem to be solved by the present invention is to provide a hydraulic brake system including: (i) a cylinder device including: a pressurizing piston; a front chamber located in front of the pressurizing piston, and a rear-force control device provided at a rear of the pressurizing piston, designed to apply a driving force (hereinafter referred to as "rear force") from a rear side of the pressurizing piston, and capable of controlling the rear force; and (ii) a brake cylinder coupled to the front chamber, wherein presence or absence of leakage of working liquid from a brake line including the front chamber and the brake cylinder is detected without based on a hydraulic pressure in the brake line.

Means for Solving Problem and Effects

In a hydraulic brake system according to the present invention, presence or absence of a leakage of working liquid from a brake line is detected based on one or more of, e.g., a rear force applied to a pressurizing piston, a running state including: a velocity of rotation and a rotation deceleration of a wheel on which a brake cylinder is provided; a yaw rate of a vehicle; and a vehicle deceleration, changes of these factors, and a difference in rotational velocity and/or rotation deceleration between a plurality of wheels.

The brake line includes: a front chamber, at least one brake cylinder coupled to the front chamber; and a liquid passage for coupling the at least one brake cylinder and the front chamber to each other.

The leakage of the working liquid from the brake line is a state in which at least a portion of the working liquid in the front chamber leaks to an outside without being supplied to at least one brake cylinder to which the working liquid is to be supplied from the front chamber. A position of the leakage includes (i) a position in the front chamber, (ii) a position in the liquid passage coupled to the front chamber, and (iii) a position in the brake cylinder coupled to the liquid passage. This applies to a leakage of the working liquid from the front chamber which will be described below.

CLAIMABLE INVENTION

There will be described by way of examples inventions recognized to be claimable by the present applicant or features of the invention.

(1) A hydraulic brake system comprising:
a cylinder device provided in a vehicle and comprising (a) a housing, (b) at least one pressurizing piston fluid-tightly and slidably fitted in the housing, (c) at least one front chamber respectively provided in front of the at least one pressurizing piston, and (d) a rear-force control device operable by a supply of electric power and capable of controlling a rear force that is a driving force applied from a rear side, the rear-force control device being configured to apply the rear force to one of the at least one pressurizing piston;
a plurality of brake cylinders of a plurality of hydraulic brakes coupled to the at least one front chamber and provided respectively for a plurality of wheels of the vehicle, the plurality of brakes being configured to respectively restrain rotations of the plurality of wheels; and
a liquid-leakage detection device configured to detect presence or absence of a liquid leakage from at least one line of at least one brake line based on at least one of the rear force, a physical quantity indicative of a state of rotation of at least one of the plurality of wheels, a physical quantity indicative of a state of running of the vehicle, the at least one brake line comprising the at least one front chamber and at least one of the plurality of brake cylinders coupled to each of the at least one front chamber.

The cylinder device may include one or more pressurizing pistons. For example, in a case where the cylinder device includes two pressurizing pistons, the cylinder device also includes two front chambers. Connected to each of the front chambers is at least one of the brake cylinders of the brakes provided for the respective wheels. The rear force is applied to a rear one of the two pressurizing pistons.

In a case where the cylinder device includes two front chambers, and the II configuration is used, the brake cylinders provided for the front left and right wheels are coupled to one of the front chambers, and the brake cylinders provided for the rear left and right wheels is coupled to the other. In a case where the X configuration is used, the brake cylinders provided for the front right wheel and the rear left wheel are coupled to one of the front chambers, and the brake cylinders provided for the front left wheel and the rear right wheel are coupled to the other.

In a case where the cylinder device includes (a) a rear chamber provided at a rear of one pressurizing piston, (b) a power hydraulic pressure source capable of supplying a high hydraulic pressure to the rear chamber, and (c) a rear-hydraulic-pressure control device capable of controlling a hydraulic pressure in the rear chamber by utilizing a hydraulic pressure provided by the power hydraulic pressure source, the rear-force control device is constituted by components including the rear chamber, the power hydraulic pressure source, and the rear-hydraulic-pressure control device. The rear-hydraulic-pressure control device may be configured: (i) to include at least one electromagnetic valve provided between the power hydraulic pressure source and the rear chamber; and (ii) in a case where the power hydraulic pressure source includes a pump device that includes: a pump; and a pump motor, to include, e.g., a drive circuit capable of controlling an operating state of the pump motor to control an output hydraulic pressure. It is noted that the rear chamber and the power hydraulic pressure source are considered to constitute a rear-force apply device. The hydraulic pressure in the rear chamber is not supplied to the brake cylinder in most cases.

In a case where the cylinder device includes (a) an electric motor provided at a rear of one pressurizing piston, (b) a motion converter configured to convert rotation of the electric motor to linear motion to transmit the linear motion to the pressurizing piston, and (c) a control circuit capable of controlling an output of the electric motor, the rear-force control device is constituted by components including the electric motor, the motion converter, and the control circuit, and the rear-force apply device is constituted by components including the electric motor and the motion converter.

In any case, control for the rear force controls the hydraulic pressure in the front chamber, so that a hydraulic pressure in the brake cylinder is controlled.

There will be specifically explained modes of detecting the presence or absence of the liquid leakage.

(i) When a liquid leakage occurs from at least one of at least one brake line, a hydraulic pressure in a brake cylinder that belongs to the brake line lowers, whereby a wheel deceleration (may be referred to as "rotation deceleration") lowers. Thus, the presence or absence of the liquid leakage can be recognized based on change in a rotation deceleration of one of the wheels.

Also, the presence or absence of the liquid leakage from the at least one line can be detected by comparing the velocities of rotations of two or more wheels with each other.

In this way, the physical quantity indicative of the rotational state of the wheel includes the rotational velocity and the rotation deceleration. The presence or absence of the liquid leakage from the at least one line can be recognized based on, e.g., the change in the physical quantity indicative of the rotational state of the one wheel and a change in the difference between the two or more wheels in the physical quantity and/or the physical quantity.

(ii) In the event of a liquid leakage from the at least one line, a difference may be generated between a left wheel and a right wheel in rotational velocity, resulting in generation of a yaw rate in the vehicle, depending upon a degree of the liquid leakage and a liquid-leakage suffered position. In this case, the presence or absence of the liquid leakage from the at least one line can be recognized based on, e.g., the yaw rate (i.e., a magnitude and a direction) of the vehicle or a change in the yaw rate.

(iii) In the event of a liquid leakage from the at least one line, a braking force applied to the whole of the vehicle becomes smaller, resulting in reduction in deceleration of the vehicle in its longitudinal direction (may be referred to as "vehicle deceleration"). Accordingly, the presence or absence of the liquid leakage from the at least one line can be recognized based on, e.g., the vehicle deceleration and/or a change in the deceleration.

Thus, the physical quantity indicative of the state of running of the vehicle includes: a physical quantity indicative of a turning state such as the yaw rate and a lateral acceleration; and a physical quantity indicative of a braking state such as longitudinal deceleration of the vehicle.

(iv) Based on a balance of force in the pressurizing piston, a predetermined relationship is established between the rear force and a force applied from a front side (may be referred to as "force related to the hydraulic pressure in the front chamber"). Accordingly, a magnitude, a change state, and the like of the hydraulic pressure in the front chamber can be recognized based on the rear force.

Also, when the pressurizing piston is bottomed due to the liquid leakage from the brake line, the force applied from the front side increases accordingly, resulting in increase in the rear force. The bottoming can be recognized based on a change in the rear force.

It is noted that the rear force has a magnitude equal to a magnitude obtained by multiplying the hydraulic pressure in the rear chamber by a pressure receiving area, but since the pressure receiving area has been determined, the rear force can be considered to correspond to the hydraulic pressure in the rear chamber.

(v) The presence or absence of the liquid leakage from the at least one line can be recognized more accurately based on two or more of the rear force, a physical quantity associated with the velocity of rotation of the wheel, and the physical quantity indicative of the state of running of the vehicle.

When detecting the presence or absence of the liquid leakage from the at least one line, this detection is preferably performed on the precondition that the rear-force control device is normal, but the presence or absence of the liquid leakage may not be detected after the rear-force control device is determined to be normal.

(2) The hydraulic brake system according to the above (1), wherein the hydraulic brake system comprises a rear-force detection device configured to detect the rear force, and wherein the liquid-leakage detection device comprises a rear-force-based liquid leakage detector configured to detect the presence or absence of the liquid leakage from the at least one line based on a difference between an estimated rear force as an estimated value of the rear force and an actual rear force as a value detected by the rear-force detection device.

For example, when an absolute value of the difference between the actual rear force and the estimated rear force is equal to or larger than a liquid-leakage determination threshold value, a liquid leakage from one of the brake lines can be detected.

When the pressurizing piston is bottomed due to the liquid leakage from the brake line, a forward force increases, resulting in increase in the rear force. Accordingly, in a case where a state in which the absolute value of the difference between the actual rear force and the estimated rear force is large is changed to a state in which the absolute value is small, when the actual rear force has increased at a rate equal to or higher than the bottoming determination threshold value, a liquid leakage from the at least one line can be detected.

(3) The hydraulic brake system according to the above (2), wherein the rear-force-based liquid leakage detector is configured to detect that there is a liquid leakage from the at least one line, when a state in which the actual rear force is less than the estimated rear force by an amount equal to or greater than the first malfunction determination threshold value has continued for a time equal to or greater than a first malfunction determination time.

In the event of a liquid leakage from the brake line, the rear force does not increase sufficiently. Thus, the actual rear force becomes small with respect to a rear force estimated assuming a case where there is no liquid leakage. However, it may not be determined that the actual rear force is small with respect to the estimated rear force due to the liquid leakage from the brake line, due to, e.g., noises in a sensor or the like, or due to a delay in control.

However, in the case where the state in which the actual rear force is less than the estimated rear force by an amount equal to or greater than the first malfunction determination threshold value has continued for a time equal to or greater than the first malfunction determination time, it is possible to detect that the state is due to the liquid leakage from the brake line, making a result of detection more reliable.

In this case, in a case where the first malfunction determination threshold value is set at such a large value that cannot be generated by the delay in control, the first malfunction determination time can be set at zero or a very short time (e.g., a length of time capable of preventing erroneous determination which is caused in a case where the actual rear force is detected as a relatively small value due to a sensor-side state).

Also, in a case where the first malfunction determination threshold value is a value that can be generated due to, e.g., the delay in control, the first malfunction determination time can be determined, in normal control, at a time longer than a length of time that can compensate for the delay in control.

Thus, the first malfunction determination threshold value and the first malfunction determination time can be set in association with each other.

As will be described below, the estimated rear force can be set at a target rear force that is used in a case where the rear force is controlled to be brought closer to the target rear force, or a value based on, e.g., an operation amount of the rear-force control device (which may correspond to a control amount), for example.

It is noted that the first malfunction determination time is preferably set at a value greater than zero but may be set at zero.

(4) The hydraulic brake system according to the above (2) or (3), wherein the rear-force-based liquid leakage detector comprises a pressure-difference-based detector configured to detect that there is a liquid leakage from the at least one line, when a state in which a subtraction value obtained by subtracting the actual rear force from the estimated rear force is equal to or greater than a first malfunction determination threshold value had continued for a time equal to or greater than a first malfunction determination time, and thereafter the subtraction value obtained by subtracting the actual rear force from the estimated rear force has become equal to or less than a first return determination threshold value that is less than the first malfunction determination threshold value.

(5) The hydraulic brake system according to any one of the above (2) through (4), wherein the rear-force-based liquid leakage detector comprises (a) a provisional liquid leakage detector configured to provisionally detect that there is a liquid leakage from the at least one line, when a subtraction value obtained by subtracting the actual rear force from the estimated rear force is equal to or greater than a second malfunction determination threshold value, and (b) a definite liquid leakage detector configured to definitely detect that there is the liquid leakage, when an absolute value of a difference between an actual bottoming time and an estimated bottoming time is equal to or less than a predetermined estimated validity determination value, wherein the actual bottoming time is a length of time actually required from a point in time when the liquid leakage is provisionally detected by the provisional liquid leakage detector, to a point in time when the subtraction value obtained by subtracting the actual rear force from the estimated rear force becomes equal to or less than a second return determination threshold value that is less than the second malfunction determination threshold value, and wherein the estimated bottoming time is a length of time estimated based on at least a position of the one pressurizing piston relative to the housing at the point in time when the liquid leakage is provisionally detected by the provisional liquid leakage detector, and the estimated bottoming time is a length of time from the point in time when the liquid leakage is provisionally detected to a point in time when the subtraction value becomes equal to or less than the second return determination threshold value.

The first malfunction determination threshold value and the second malfunction determination threshold value may be equal to or different from each other. Likewise, the first return determination threshold value and the second return determination threshold value may be equal to or different from each other. Since the second malfunction determination threshold value is a value used for the provisional liquid leakage detector, the second malfunction determination threshold value may be a value smaller than the first malfunction determination threshold value. Conversely, there is a way of thinking that the second malfunction determination threshold value is preferably set at a value larger than the first malfunction determination threshold value in order to provisionally determine the presence or absence of the liquid leakage without using the first malfunction determination time.

When the pressurizing piston is bottomed, the actual rear force gets closer to the estimated rear force, so that a state in which the subtraction value obtained by subtracting the actual rear force from the estimated rear force is equal to or larger than the first (second) malfunction determination threshold value is switched to a state in which the subtraction value obtained by subtracting the actual rear force from the estimated rear force is equal to or less than the first (second) return determination threshold value.

In a case where the pressurizing piston (i.e., the one pressurizing piston to which the rear force is to be applied) is advanced by the rear force, the position of the pressurizing piston relative to the housing is located at a fronter side in a case where an actual rear force at the point in time when the provisional liquid leakage is detected is large than in a case where the actual rear force at the point in time when the provisional liquid leakage is detected is small. In other words, the pressurizing piston is located at a position at which its stroke (which means a travel and can be represented by a distance of movement and an angle of pivot) from the retracted end position is larger in a case where the rear force is large than in a case where the rear force is small. Accordingly, it is possible to estimate that the remaining stroke required for the pressurizing piston to be bottomed is short. Also, in a case where the velocity of movement of the pressurizing piston is the same, an estimated value of a time until the bottoming (i.e., the estimated bottoming time) can be made longer in a case where the remaining stroke is long than in a case where the remaining stroke is short.

In a case where an absolute value of a difference between the estimated bottoming time and a length of time (i.e., the actual bottoming time) from the point in time when the liquid leakage is detected provisionally to a point in time when the piston is actually bottomed is equal to or smaller than the estimated validity determination value, it is possible to definitely detect that the estimation is appropriate, that is, it is possible to definitely detect that the pressurizing piston is bottomed due to the liquid leakage from the brake line, thereby improving reliability of a result of the detection of the presence or absence of the liquid leakage.

(6) The hydraulic brake system according to the above (5), wherein the definite liquid leakage detector comprises a first bottoming time estimator configured to determine the estimated bottoming time at a shorter time in a case where the actual rear force at the point in time when the liquid leakage is provisionally detected by the provisional liquid leakage detector is large than in a case where the actual rear force at the point in time when the liquid leakage is provisionally detected by the provisional liquid leakage detector is small.

(7) The hydraulic brake system according to the above (5) or (6), wherein the definite liquid leakage detector comprises a second bottoming time estimator configured to obtain the estimated bottoming time based on both of the actual rear force at a point in time when the provisional liquid leakage detector has provisionally detected the liquid leakage and a velocity of movement of the pressurizing piston.

The remaining stroke (S) is shorter in a case where the actual rear force is large than in a case where the actual rear force is small. The velocity of movement of the pressurizing piston can be obtained based on a state of the rear-force control device at a point in time when the provisional liquid leakage is detected. For example, in a case where the rear-force control device includes the rear chamber, the power hydraulic pressure source, and the electromagnetic valve, a flow rate of the working liquid supplied to the rear chamber is found based on, e.g., the degree of opening of the electromagnetic valve and a pressure difference between the hydraulic pressure provided by the power hydraulic pressure source and the hydraulic pressure in the rear chamber, and it is found that a velocity v of movement of the pressurizing piston is higher in a case where the flow rate of the supplied working liquid is large than in a case where the flow rate is small. Accordingly, the estimated bottoming time Ten' is obtained according to the equation (Ten'=SR).

It is noted that in a case where the rear-force control device includes an electric motor, a motion converter, and a motor controller, a stroke of the pressurizing piston from its retracted end position is found based on the cumulative number of rotations of the electric motor from a point in time when the pressurizing piston is located at its retracted end position to a point in time when the liquid leakage is provisionally detected, and a remaining stroke S for the bottoming is found. Also, a velocity v of movement of the pressurizing piston is found based on a speed of rotation of the electric motor at that time. Accordingly, the estimated bottoming time Ten' can be obtained based on these.

(8) The hydraulic brake system according to any one of the above (2) through (7), wherein the rear-force-based liquid leakage detector comprises a rate-based detector configured to detect that there is the liquid leakage from the at least one line, when the actual rear force has increased at a rate equal to or greater than a malfunction determination rate, from a state in which the actual rear force is less than the estimated rear force by an amount equal to or greater than a third malfunction determination threshold value.

When the pressurizing piston is bottomed, the rear force increases at a high rate. Accordingly, the presence or absence of the liquid leakage can be detected based on this increase.

For example, the malfunction determination rate can be set at a rate that cannot be achieved by the rear-force control device and that can be achieved by the bottoming of the pressurizing piston. In this case, the increase in the increase rate is not due to the control by the rear-force control device but due to the bottoming. An upper limit value of the increase rate of the rear force by the control may be determined by a capability of the rear-force control device, and in a case where an upper limit value is provided for a control command value, the upper limit value of the increase rate may be determined by the upper limit value of the control command value. Thus, by determining the malfunction determination rate based on these limits, it is possible to detect an increase in the rear force due to the bottoming.

Also, the malfunction determination rate can be determined based on rates of changes of the target rear force and a target value of the hydraulic pressure in the front chamber, for example. For example, a value larger than these change rates can be set as the malfunction determination rate.

The third malfunction determination threshold value may be equal to or different from the first malfunction determination threshold value and the second malfunction determination threshold value. Since the presence of the liquid leakage is detected when the actual rear force has increased at a rate equal to or higher than the malfunction determination rate, the third malfunction determination threshold value can also be set at a value smaller than each of the first malfunction determination threshold value and the second malfunction determination threshold value. Also, after detecting that a state in which the absolute value of the difference between the actual rear force and the estimated rear force is equal to or larger than the third malfunction determination threshold value has continued for a time equal to or longer than a third malfunction determination time (which may be equal to or different from each of the first malfunction determination time and the second malfunction determination time), it may be detected whether or not the actual rear force has increased at a rate equal to or higher than the malfunction determination rate.

Also, reliability can be made more reliable by combining the technical features described in (8) and the technical features described in (4)-(7).

(9) The hydraulic brake system according to any one of the above (3) through (8), wherein the hydraulic brake system comprises a rear-force-control-device malfunction detector configured to detect that there is a malfunction in the rear-force control device, when a state in which the subtraction value obtained by subtracting the actual rear force from the estimated rear force is equal to or greater than the first malfunction determination threshold value has continued for a time equal to or greater than a rear-system malfunction determination time that is greater than the first malfunction determination time.

In a case where the rear force cannot be applied sufficiently due to the malfunction in the rear-force control device, the pressurizing piston may have been hardly moved. This case has a low possibility of the bottoming, and accordingly there is a low possibility that the absolute value of the difference between the actual rear force and the estimated rear force becomes small.

(10) The hydraulic brake system according to any one of the above (2) through (9), wherein the rear-force-based liquid leakage detector comprises an operation-amount-based rear force estimator configured to obtain the estimated rear force based on an operation amount of the rear-force control device.

The operation amount of the rear-force control device is an amount of operation from the start of the control of the rear force.

In a case where the rear-force control device includes (i) a rear chamber provided at a rear of the pressurizing piston, (ii) a power hydraulic pressure source, and (iii) an electromagnetic valve provided between the power hydraulic pressure source and the rear chamber, for example, the operation amount may be (a) an amount of the working liquid supplied from the power hydraulic pressure source to the rear chamber via the electromagnetic valve from the start of the control, (b) a total amount of supply current (may be referred to as "control amount") from the start of the control in a case where a degree of opening of the electromagnetic valve increases with an increase in the supply current, or (c) an amount of hydraulic pressure supplied from the power hydraulic pressure source from the start of the control (i.e., an amount of consumption of hydraulic pressure in the rear chamber). A rear force in a case where the hydraulic brake system is normal can be determined based on at least one of these operation amounts.

Also, in a case where the rear-force control device includes (i) an electric motor, (ii) a motion converter, and (iii) a motor controller capable of controlling output of the electric motor, a stroke of an output member of the motion converter from its retracted end position may be set at an operation amount. In the case of the hydraulic brake system is normal, it is possible to estimate that the rear force is large in a case where the stroke of the output member is large.

(11) The hydraulic brake system according to any one of the above (2) through (10), wherein the rear-force control device comprises a rear force controller configured to control the rear force such that the rear force is brought closer to a target rear force, and the rear-force-based liquid leakage detector comprises a target rear force estimator configured to obtain the target rear force as the estimated rear force.

When the hydraulic brake system is normal, the actual rear force is to be substantially equal in magnitude to the target rear force. In view of this, the target rear force can be employed as the estimated rear force.

Also, in (10), when the estimated rear force is obtained, it is possible to take, e.g., changes in the target rear force and the target rear force into consideration.

(12) The hydraulic brake system according to any one of the above (2) through (11),
wherein the rear-force control device comprises (a) a rear chamber provided at a rear of the one pressurizing piston, (b) a power hydraulic pressure source operable by a supply of electric power and capable of supplying a high hydraulic pressure, (c) at least one electromagnetic valve capable of controlling a hydraulic pressure in the rear chamber by utilizing the hydraulic pressure provided by the power hydraulic pressure source, and (d) an electromagnetic valve controller configured to control the at least one electromagnetic valve to bring the hydraulic pressure in the rear chamber closer to a target rear hydraulic pressure,
wherein the rear-force detection device comprises a rear-hydraulic-pressure detection device configured to detect the hydraulic pressure in the rear chamber, and
wherein the liquid-leakage detection device comprises a rear-hydraulic-pressure-based detector configured to detect the presence or absence of the liquid leakage based on an actual rear hydraulic pressure that is a value detected by the rear-hydraulic-pressure detection device.

A value obtained by multiplying an area of a pressure receiving surface by the hydraulic pressure in the rear chamber provided at a rear of the pressurizing piston is the rear force. In a case where the area of the pressure receiving surface is fixed, there exhibits a one-to-one correspondence between the hydraulic pressure in the rear chamber and the rear force. Accordingly, the presence or absence of the liquid leakage may be detected based on the actual rear hydraulic pressure and may determine an actual rear force corresponding to the actual rear hydraulic pressure to detect the actual rear force based on the actual rear force.

(13) The hydraulic brake system according to the above (12),
wherein the cylinder device comprises (a) an input piston coupled to a brake operating member, (b) a transmission rod fitted in the one pressurizing piston immovably relative to the one pressurizing piston in an axial direction of the transmission rod, the transmission rod being engaged with the input piston movably relative to the input piston in the axial direction, and (c) a holder fixed between the one pressurizing piston and the input piston in the housing and configured to fluid-tightly and slidably hold the transmission rod, wherein the rear chamber is a hydraulic-pressure chamber located at a rear of the pressurizing piston and in front of the holder, and wherein the cylinder device is capable of taking: a power operating state in which the one pressurizing piston is advanced by the hydraulic pressure in the rear chamber in a state in which the input piston is allowed to move relative to the transmission rod; and a manual operating state in which the input piston is coupled to the one pressurizing piston via the transmission rod, and the one pressurizing piston is advanced by a brake operating force applied to the input piston, and
wherein the liquid-leakage detection device comprises a power-operating-state detection start detector configured to start detecting the presence or absence of the liquid leakage in the power operating state.

The transmission rod is fitted at its front end portion in the pressurizing piston immovably relative to the one pressurizing piston, held at its intermediate portion, by the holder fluid-tightly and slidably, and held at its rear portion by the input piston movably relative to the input piston. In a state in which the input piston is moved relative to the transmission rod, the brake operating force applied to the input piston is not transmitted to the pressurizing piston, and the pressurizing piston is advanced by the hydraulic pressure in the rear chamber, so that the hydraulic pressure in the front chamber becomes a hydraulic pressure related to the rear hydraulic pressure. Since the holder is located between the pressurizing piston and the input piston, this system is configured such that a forward force applied to the input piston does not affect the rear chamber. This state is the power operating state. It is noted that the power operating state includes a state (an automatic-brake operating state) in which the pressurizing piston is advanced by the rear hydraulic pressure with the brake operating member not being operated. It is noted that, in the power operating state, the hydraulic pressure in the rear chamber is controlled such that the brake operating force applied to the input piston is not transmitted to the transmission rod. For example, the hydraulic pressure in the rear chamber can be controlled such that an amount and speed of advance of the transmission rod with the advance of the pressurizing piston are larger than those of the input piston relative to the transmission rod.

In the event of a malfunction in the rear-hydraulic-pressure control device or in a case where the amount and speed of advance of the input piston are very large, on the other hand, the input piston is brought into contact with the transmission rod, and the transmission rod is advanced with the advance of the input piston, causing the pressurizing piston to be advanced. This state is the manual operating state. In the manual operating state, not only the brake operating force but also a forward force related to the rear hydraulic pressure may be applied to the pressurizing piston.

The detection of the presence or absence of the leakage of the working liquid from the front chamber is started in the power operating state. At the point in time when the pressurizing piston has been bottomed, however, the cylinder device may be in the manual operating state.

(14) The hydraulic brake system according to the above (12), wherein the cylinder device comprises (a) an input piston coupled to a brake operating member, and (b) an intermediate piston disposed at a rear of the rear chamber and comprising a pressure receiving surface, and wherein the cylinder device is capable of taking: a power operating state in which the one pressurizing piston is advanced by the hydraulic pressure in the rear chamber in a state in which the intermediate piston is inhibited from moving, and the input piston is allowed to move relative to the intermediate piston; and a manual operating state in which the input piston is coupled to the one pressurizing piston via the intermediate piston, and the one pressurizing piston is advanced by a brake operating force applied to the input piston, in a state in which the intermediate piston is allowed to move, and wherein the liquid-leakage detection device comprises a power-operating-state detector configured to detect the presence or absence of the liquid leakage in the power operating state.

In a case where the input piston is moved relative to the intermediate piston in the state in which the intermediate piston is inhibited from moving, the hydraulic pressure in the rear chamber does not increase with an increase in the brake operating force via the intermediate piston. A hydraulic pressure related to the hydraulic pressure in the rear chamber is generated in the front chamber. This state is the power operating state.

The power operating state includes the automatic-brake operating state. In the state in which the intermediate piston is allowed to move, on the other hand, the intermediate piston is advanced with the advance of the input piston, causing the pressurizing piston to be advanced. A hydraulic pressure related to a forward force applied to the pressurizing piston is generated in the front chamber, and this state is the manual operating state.

(15) The hydraulic brake system according to any one of the above (2) through (11), wherein the rear-force control device comprises (a) an electric motor, (b) a motion converter device configured to convert rotation of the electric motor to linear motion to transmit the linear motion to the one pressurizing piston, and (c) a motor controller configured to control the rear force by controlling the electric motor, to control a hydraulic pressure in the front chamber, wherein the rear-force detection device comprises a current detector configured to detect a current flowing to the electric motor, and wherein the liquid-leakage detection device comprises a motor-current-based detector configured to detect the presence or absence of the liquid leakage based on the current detected by the current detector.

A load imposed on the electric motor is larger in a case where an amount of the current flowing to the electric motor is large than in a case where the amount of the current flowing to the electric motor is small. Thus, the load imposed on the electric motor, i.e., the actual rear force can be obtained based on the current flowing to the electric motor.

The presence or absence of the liquid leakage may be detected based on the current and may be detected based on the actual rear force obtained based on the current.

The rear-force control device may have a booster function. Where a push rod coupled to a brake pedal is coupled to the pressurizing piston and where both of an operating force of a driver which is applied to the pressurizing piston via the push rod and the rear force applied by the rear-force apply device are applied to the pressurizing piston, the rear force can be controlled to change a rate of boosting.

(16) The hydraulic brake system according to any one of the above (1) through (15), wherein the cylinder device comprises two front chambers as the at least one front chamber, wherein (a) a line comprising: one front chamber of the two front chambers; and a first brake cylinder provided for a first wheel which is one of the plurality of wheels and which is coupled to the one front chamber is a first brake line, and (b) a line comprising: another front chamber of the two front chambers; and a second brake cylinder provided for a second wheel which is one of the plurality of wheels except the first wheel and which is coupled to said another front chamber is a second brake line, and wherein the liquid-leakage detection device comprises a wheel-velocity-difference-based liquid leakage detector configured to detect presence or absence of a liquid leakage from at least one of the two lines, based on at least one of a difference in rotational velocity between the first wheel and the second wheel and the physical quantity indicative of the state of running of the vehicle.

In the event of a liquid leakage from the brake line, the hydraulic pressure in the brake cylinder lowers, and accordingly the rotational velocity of the wheel becomes lower.

A difference in rotational velocity and/or rotation deceleration may occur between the plurality of wheels, generating a yaw rate.

Also, an unexpected lowering of the hydraulic pressure in the brake cylinder reduces vehicle deceleration.

Accordingly, the presence or absence of the liquid leakage from the at least one line can be detected based on, e.g., changes in velocity and/or deceleration of rotation of one wheel, a difference in velocity and/or deceleration of rotations between the plurality of wheels, and/or the physical quantity indicative of the state of running of the vehicle (the yaw rate and the longitudinal deceleration).

It is noted that a brake line suffering from the liquid leakage can be detected based on, e.g., the difference in velocity and/or deceleration of rotations between the plurality of wheels, the yaw rate, and the like.

(17) The hydraulic brake system according to any one of the above (1) through (16), wherein the liquid-leakage detection device comprises (a) a yaw rate detector configured to detect a yaw rate of the vehicle, and (b) a yaw rate-based liquid leakage detector configured to detect presence of a liquid leakage from at least one of the at least one brake line when an absolute value of the yaw rate detected by the yaw rate detector becomes equal to or greater than a malfunction determination yaw rate in a state in which a steering member of the vehicle is not operated.

A yaw rate may be generated in the vehicle when a difference in rotational velocity has occurred between the plurality of wheels due to the liquid leakage (when a difference in rotational velocity has occurred between the left wheel and the right wheel). Thus, in the case where the absolute value of the yaw rate is equal to or larger than the malfunction determination yaw rate, it is possible to detect that there is a liquid leakage from the at least one line.

In a case where the hydraulic brake system includes the two brake lines, and in the event of a liquid leakage from one of the two brake line, there is a case where a hydraulic pressure in one of the two brake cylinders of one of the brake lines lowers first depending upon the degree of the liquid-leakage suffered position. In this case, the difference in rotational velocity occurs between the left wheel and the right wheel, and a yaw rate is transiently generated independently of the X configuration and the II configuration.

Also, in a case where a hydraulic pressure in both of the two brake cylinders of one of the brake lines have lowered, a yaw rate is hardly generated in the II configuration, but in the X configuration, there is a high possibility of generation of the yaw rate due to generation of a difference in braking force between the left wheel and the right wheel.

(18) The hydraulic brake system according to the above (16) or (17), wherein the liquid-leakage detection device comprises a liquid leakage identifying portion configured to detect whether a brake line in which a liquid leakage has occurred is the first brake line or the second brake line, based on at least one of a difference in rotational velocity between the first wheel and the second wheel and a direction of a yaw rate of the vehicle, and wherein the hydraulic brake system comprises a yaw rate reduction control device configured to, when the liquid leakage identifying portion has detected that there is a liquid leakage from the first brake line, reduce the yaw rate of the vehicle by controlling a hydraulic pressure in the second brake cylinder that belongs to the second brake line.

In the hydraulic brake system using the X configuration, it is possible in most cases to identify a brake line suffering from the liquid leakage, namely, the first brake line or the second brake line, based on a difference in rotational velocity between the first wheel and the second wheel or a direction of the yaw rate.

In this case, the yaw rate can be reduced by controlling a hydraulic pressure or pressures in at least one of brake cylinders provided respectively for two wheels included in a brake line not suffering from the liquid leakage (i.e., a normal brake line).

(19) The hydraulic brake system according to any one of the above (1) through (18), wherein the cylinder device comprises two front chambers as the at least one front chamber, wherein (a) a line comprising: one front chamber of the two front chambers; and a first brake cylinder provided for a first wheel which is one of the plurality of wheels and which is coupled to the one front chamber is a first brake line, and (b) a line comprising: another front chamber of the two front chambers; and a second brake cylinder provided for a second wheel which is one of the plurality of wheels except the first wheel and which is coupled to said another front chamber is a second brake line, and wherein the liquid-leakage detection device comprises a deceleration-based liquid leakage detector configured to detect presence of a liquid leakage from at least one of the two brake lines when a deceleration of the vehicle has decreased in a state in which the rear force is controlled to be constant by the rear-force control device.

When the hydraulic brake system is normal in a state in which the rear force is controlled to be constant, the vehicle deceleration should also be constant. In contrast, in the event of the liquid leakage from the at least one line, the vehicle deceleration lowers. Also, the vehicle deceleration is lower after the bottoming than before the bottoming.

Thus, the presence or absence of the liquid leakage from the brake line can be detected accurately based on reduction in the vehicle deceleration or a manner of the reduction.

(20) The hydraulic brake system according to any one of the above (1) through (19), wherein the hydraulic brake system comprises a rear-force detection device configured to detect an actual rear force that is an actual value of the rear force, and wherein the liquid-leakage detection device comprises a bottoming detector configured to detect bottoming of at least one of the at least one pressurizing piston based on at least one of a change in the actual rear force detected by the rear-force detection device and a change in a difference between the actual rear force and an estimated rear force that is an estimated value of the rear force.

When the pressurizing piston is bottomed, the actual rear force sharply increases. Also, the difference between the estimated rear force and the actual rear force is large before the bottoming but becomes small after the bottoming. Thus, the bottoming can be detected based on these phenomena.

It is noted that in a case where the cylinder device includes two pressure chambers, both of two brake lines hardly suffer from the liquid leakage at the same time. Accordingly, it is possible to estimate that a liquid leakage occurs from one of the brake lines, and it is possible to consider that one of the pressurizing pistons is bottomed.

(21) A hydraulic-pressure producing device comprising:

a cylinder comprising (a) a housing, (b) a pressurizing piston fluid-tightly and slidably fitted in the housing, (c) a front chamber provided in front of the pressurizing piston, and (d) a rear chamber provided at a rear of the pressurizing piston;

a rear-hydraulic-pressure control device comprising a power hydraulic pressure source operable by a supply of electric power and capable of producing a high hydraulic pressure, the rear-hydraulic-pressure control device being configured to control a hydraulic pressure in the rear chamber to bring the hydraulic pressure in the rear chamber closer to a target hydraulic pressure;

a rear-hydraulic-pressure detection device configured to detect the hydraulic pressure in the rear chamber; and a liquid-leakage detection device configured to detect a leakage of working liquid from the front chamber in a case where an actual rear hydraulic pressure that is a value detected by the rear-hydraulic-pressure detection device has increased at a rate equal to or greater than a set rate, from a state in which the actual rear hydraulic pressure is less than the target hydraulic pressure by a value equal to or greater than a first set value.

The rear hydraulic pressure that is the hydraulic pressure in the rear chamber is controlled so as to be brought closer to the target hydraulic pressure. This rear hydraulic pressure advances the pressurizing piston, so that the hydraulic pressure related to the rear hydraulic pressure is produced in the front chamber. Regarding the pressurizing piston, there is a predetermined relationship between the hydraulic pressure in the rear chamber and a hydraulic pressure in the front chamber. Accordingly, in a case where an appropriate hydraulic pressure is not produced in the front chamber due to, e.g., the liquid leakage, the rear hydraulic pressure does not increase appropriately even when the working liquid is supplied to the rear chamber, so that the actual rear hydraulic pressure becomes smaller than the target hydraulic pressure by the value equal to or greater than the first set value.

When the pressurizing piston is advanced and bottomed by the supply of the working liquid into the rear chamber, the rear hydraulic pressure increases at the rate equal to or greater than the set rate.

In view of the above, where the actual rear hydraulic pressure has increased at the rate equal to or greater than the set rate, from the state in which the actual rear hydraulic pressure is less than the target hydraulic pressure by the value equal to or greater than the first set value, it is possible to detect that there is a leakage of the working liquid from the front chamber.

It is noted that the rear-hydraulic-pressure control device may be (i) a device configured to control the hydraulic pressure in the rear chamber by controlling a hydraulic pressure output from the power hydraulic pressure source and (ii) a device which includes at least one electromagnetic valve provided between the power hydraulic pressure source, a reservoir, and the rear chamber and which is configured to control the electromagnetic valve to control the hydraulic pressure in the rear chamber.

The target hydraulic pressure may be a value determined based on a state of operation of the brake operating member by the driver and may be a value determined based on a state of the vehicle independently of the state of operation of the brake operating member. Also in a state in which the brake operating member is not operated, the hydraulic pressure can be produced in the front chamber by the rear hydraulic pressure.

The present hydraulic-pressure producing device can adapt any of the technical features in the forms (1) through (20).

The first set value in the present device corresponds to any of the first malfunction determination threshold value, the second malfunction determination threshold value, and the third malfunction determination threshold value, and the set rate corresponds to the malfunction determination rate. Also, the components such as the cylinder and the rear-hydraulic-pressure control device constitute the cylinder device, and the components such as the cylinder device and the liquid-leakage detection device constitute the hydraulic-pressure producing device. Furthermore, the target hydraulic pressure is one mode of an estimated rear hydraulic pressure as the estimated rear force.

(22) The hydraulic-pressure producing device according to the above (21), wherein the liquid-leakage detection device comprises a detector configured to detect that there is a leakage of the working liquid, in a case where a state in which a value obtained by subtracting the actual rear hydraulic pressure from the target hydraulic pressure is equal to or greater than the first set value had continued for a time equal to or longer than the set length of time, and thereafter the actual rear hydraulic pressure has increased at a rate equal to or greater than the set rate.

The set length of time corresponds to any of the first and second malfunction determination times.

(23) The hydraulic-pressure producing device according to the above (22), wherein the detector is configured to detect that there is a leakage of the working liquid, in a case where the value obtained by subtracting the actual rear hydraulic pressure from the target hydraulic pressure has become equal to or less than a second set value that is less than the first set value, by the increase in the actual rear hydraulic pressure at the rate equal to or greater than the set rate.

The second set value corresponds to the first return determination threshold value and the second return determination threshold value.

(24) The hydraulic-pressure producing device according to any one of the above (21) through (23), wherein the hydraulic-pressure producing device comprises a malfunction detection device configured to detect that there is a malfunction in a control system comprising the rear chamber and the rear-hydraulic-pressure control device, in a case where a state in which the actual rear hydraulic pressure is less than the target hydraulic pressure by a value equal to or greater than the first set value has continued for a time equal to or longer than a malfunction determination time that is longer than the set length of time, wherein the malfunction detection device is configured to detect that the pressurizing piston has bottomed, in a case where a duration of a state in which the actual rear hydraulic pressure is less than the target hydraulic pressure by a value equal to or greater than the first set value is less than the malfunction determination time, and thereafter the actual rear hydraulic pressure has increased at a rate equal to or greater than the set rate.

The rear hydraulic pressure increases at a timing that is later than the increase in the target hydraulic pressure, so that the rear hydraulic pressure becomes low with respect to the target hydraulic pressure at the beginning of the actuation of the cylinder. In a case where there is no leakage of the working liquid from the front chamber, however, the rear hydraulic pressure is immediately brought closer to the target hydraulic pressure.

In the event of a leakage of the working liquid from the front chamber, on the other hand, the rear hydraulic pressure does not increase appropriately and becomes smaller than the target hydraulic pressure by an amount equal to or greater than the first set value. This state continues for a length of time that is longer than a response delay time.

In a case where the pressurizing piston is advanced by the supply of the working liquid to the rear chamber, but there is a leakage of the working liquid from the front chamber, the pressurizing piston is to be bottomed. When the pressurizing piston is bottomed, the reaction force increases, and the rear hydraulic pressure increases rapidly. In other words, the pressurizing piston is bottomed when an amount of the working liquid supplied to the rear chamber (which can be considered as an amount of the working liquid supplied from the rear-hydraulic-pressure control device) becomes equal to or larger than an effective capacity of the front chamber (which corresponds to a reduction of capacity of the front chamber within a period from the advance of the pressurizing piston at its retracted end position to the bottoming of the pressurizing piston).

In contrast, in a case where the hydraulic pressure in the rear chamber does not increase at a rate equal to or higher than the set rate (that is, the pressurizing piston is not bottomed) even when an amount of the working liquid that should have been supplied from the rear-hydraulic-pressure control device becomes larger than the effective capacity of the front chamber, it is considered that this problem is caused not by the leakage of the working liquid from the front chamber but by a liquid leakage from a portion including the rear-hydraulic-pressure control device and the rear chamber, a malfunction in the rear-hydraulic-pressure control device, or the like.

A flow rate q of the working liquid to be supplied from the rear-hydraulic-pressure control device to the rear chamber is determined by, e.g., a state of the rear-hydraulic-pressure control device and the hydraulic pressure in the rear chamber. Also, the effective capacity of the front chamber is well known (Qm). Accordingly, a time Tm required for an amount of the working liquid supplied to the rear chamber to become equal to the effective capacity of the front chamber is expressed as follows:

$$Tm=Qm/q$$

Assuming that a time (Tm+α) obtained by adding a time a to the time Tm required for the piston to be bottomed is a malfunction determination time Tth, the following considerations can be provided. In a case where the actual rear hydraulic pressure has increased at a rate equal to or higher than the set rate before the malfunction determination time is elapsed from the supply of the working liquid to the rear chamber or from a timing when the actual rear hydraulic pressure becomes less than the target hydraulic pressure by a value equal to or greater than the first set value, there is a liquid leakage (the pressurizing piston is bottomed). Also, in a case where the actual rear hydraulic pressure does not increase at a rate equal to or greater than the set rate (i.e., in a case where the actual rear hydraulic pressure is not brought closer to the target hydraulic pressure) even after the malfunction determination time is elapsed, there is a malfunction in a control system including the rear chamber and the rear-hydraulic-pressure control device. Examples of this malfunction include a liquid leakage from the rear chamber, a malfunction in the power hydraulic pressure source of the rear-hydraulic-pressure control device, and a malfunction in the electromagnetic valve.

The first set value may be determined at (i) a value of a difference between the target hydraulic pressure and the actual rear hydraulic pressure, which difference cannot be generated due to a delay in control or (ii) a value in which the actual rear hydraulic pressure can be recognized to be small with respect to the target hydraulic pressure, for example.

The set length of time T1 may be determined at (i) a value that is determined taking the delay in control into consideration, for example, the set length of time T1 may be determined at a time (Tr+β=T1) that is obtained by adding a time β to a response delay time Tr (which is a time required for the rear hydraulic pressure to get close to the target hydraulic pressure from a start of the control). Also, the set length of time T1 may be determined at (ii) a time that is determined taking the time Tm required for the bottoming into consideration, for example, the set length of time T1 may be determined at the time Tm (Tm=T1) or a time (Tm−γ=T1) that is shorter than the time Tm by a time γ, for example.

The set rate dPth may be determined at (i) a value that is determined based on a rate of increase of the hydraulic pressure in the rear chamber which is caused due to the bottoming of the pressurizing piston. Also, the set rate dPth may be determined at (ii) a value that is determined taking a rate of increase in the target hydraulic pressure into consideration. Since the rear-hydraulic-pressure control device controls the rear hydraulic pressure such that the rear hydraulic pressure is brought closer to the target hydraulic pressure, a rate of increase in the rear hydraulic pressure should be determined by the rate of increase in the target hydraulic pressure. Accordingly, the set rate can be determined at a value greater than the rate of increase in the rear hydraulic pressure which is determined based on the rate of increase in the target hydraulic pressure. Furthermore, the set rate dPth may also be determined at (iii) a value that cannot be generated by the control for the rear-hydraulic-pressure control device. The rear-hydraulic-pressure control device is usually configured such that an upper limit value is set for the rate of increase in the target hydraulic pressure or such that an upper limit value is set for the rate of increase in the rear hydraulic pressure by, e.g., a structure of the rear-hydraulic-pressure control device, for example, but the set rate can be set at a value that is greater than this upper limit value.

The second set value may be determined at a value in which the actual rear hydraulic pressure can be considered to have gotten close to the target hydraulic pressure. This is because, when the pressurizing piston is bottomed, the rear hydraulic pressure is considered to increase to the target hydraulic pressure.

It is noted that the second set value may also be determined at a value obtained by subtracting the hydraulic pressure related to the brake operating force from the target hydraulic pressure. This is because, in a case where the pressurizing piston receives both of a forward force produced by the rear hydraulic pressure and a force of the braking operation performed by the driver, the actual rear hydraulic pressure may not increase to a target hydraulic pressure that is determined on the precondition that the brake operating force is not applied.

(25) The hydraulic-pressure producing device according to any one of the above (21) through (24), wherein the rear-hydraulic-pressure control device comprises a target hydraulic pressure determiner configured to determine the target hydraulic pressure based on at least one of a state of operation of the brake operating member and a state of the vehicle.

For example, when a regenerative cooperative control is executed, the target hydraulic pressure is determined at such a magnitude that a total braking force including a regenerative braking force and a hydraulic braking force is brought closer to a target total braking force determined by the state of operation of the brake operating member.

The state of operation of the brake operating member is detected by an operating-state detection device. The operating-state detection device includes: a stroke sensor for detecting an operating stroke of the brake operating member; and an operating-force sensor for detecting an operating force or a physical quantity that is in one-to-one correspondence with the operating force.

In a case where the automatic brake is operated, the target hydraulic pressure is determined based on a driving slip state and/or a lateral slip state or based on a relative positional relationship between the vehicle and a vehicle in front thereof.

(26) The hydraulic-pressure producing device according to any one of the above (21) through (25), wherein the hydraulic-pressure producing device comprises a normality determiner configured to determine that a control system comprising the rear-hydraulic-pressure control device and the rear chamber is normal and that there is no leakage of the working liquid from the front chamber, when a value obtained by subtracting the actual rear hydraulic pressure from the target hydraulic pressure has not become equal to or higher than the first set value in a period from a start of the control of the rear-hydraulic-pressure control device to a time limit.

(27) The hydraulic-pressure producing device according to any one of the above (21) through (26), wherein the liquid-leakage-presence/absence detection device comprises a brake-operation liquid leakage detector configured to detect the presence or absence of the liquid leakage in a state in which the hydraulic pressure in the rear chamber is not affected by an operating force of the brake operating member. The presence or absence of the liquid leakage is detected in a normal operation of the hydraulic brake, and the hydraulic brake is not operated for detection of a malfunction. Accordingly, the presence or absence of the liquid leakage can be detected more frequently, and electric power consumed for detecting the presence or absence of the liquid leakage can be reduced.

Also, assuming that the rear hydraulic pressure is in a state in which the rear hydraulic pressure is not affected by the operating force of the brake operating member, that is, assuming that there is no malfunction, the presence or absence of the liquid leakage is detected in a state in which the rear hydraulic pressure is determined by the control of the rear-hydraulic-pressure control device. Thus, based on, e.g., a changing of the actual rear hydraulic pressure and/or a difference between the rear hydraulic pressure and the target hydraulic pressure, it is accurately obtained whether the rear hydraulic pressure changes due to a cause other than the control of the rear-hydraulic-pressure control device or not, improving reliability of detecting the presence or absence of the leakage of the working liquid from the front chamber.

(28) A hydraulic-pressure producing device comprising:

a cylinder comprising (a) a housing, (b) a pressurizing piston fluid-tightly and slidably fitted in the housing, (c) a front chamber provided in front of the pressurizing piston, and (d) a rear chamber provided at a rear of the pressurizing piston, a rear-hydraulic-pressure control device comprising a power hydraulic pressure source operable by a supply of electric power and capable of producing a high hydraulic pressure, the rear-hydraulic-pressure control device being configured to control a hydraulic pressure in the rear chamber to bring the hydraulic pressure in the rear chamber closer to a target hydraulic pressure;

a rear-hydraulic-pressure detection device configured to detect the hydraulic pressure in the rear chamber; and a bottoming detection device configured to detect bottoming of the pressurizing piston based on at least one of a change in an actual rear hydraulic pressure that is a value detected by the rear-hydraulic-pressure detection device and a difference between the actual rear hydraulic pressure and the target hydraulic pressure.

The present hydraulic-pressure producing device can adapt any of the technical features in the forms (1) through (27).

(29) The hydraulic-pressure producing device according to the above (28), wherein the bottoming detection device comprises a detector configured to detect the bottoming in at least one of (a) a case where a state in which a value obtained by subtracting the actual rear hydraulic pressure from the target hydraulic pressure is equal to or greater than the first set value had continued for a time equal to or greater than a set length of time and thereafter have become equal to or less than a second set value that is less than the first set value, and (b) a case where the actual rear hydraulic pressure has increased at a rate equal to or greater than a set rate.

For example, a state in which a difference between the target hydraulic pressure and the actual rear hydraulic pressure (i.e., the value obtained by subtracting the actual rear hydraulic pressure from the target hydraulic pressure) is equal to or greater than the first set value had continued for a time equal to or longer than the set length of time and thereafter have switched to a state in which the difference is equal to or less than the second set value, it is possible to detect that the pressurizing piston has been bottomed. In the case where the difference between the target hydraulic pressure and the actual rear hydraulic pressure is equal to or greater than the first set value, it is not clear that this state is caused by the leakage of the working liquid from the front chamber or by a malfunction in a control system including the rear chamber and the rear-hydraulic-pressure control device. In the case where the state has switched to the state in which the difference is equal to or less than the second set value, on the other hand, it can be determined that the pressurizing piston has been bottomed, that is, there is a leakage of the working liquid from the front chamber.

In a case where the set rate is set at a rate generated due to the bottoming and where the actual rear hydraulic pressure has increased at a rate equal to or greater than the set rate, it is possible to detect that the pressurizing piston has been bottomed. The set rate can be set at a value determined by a rate of change in the target hydraulic pressure or at a value that cannot be generated in the rear-hydraulic-pressure control device.

(30) A hydraulic-pressure producing device comprising:

a cylinder comprising (a) a housing, (b) a pressurizing piston fluid-tightly and slidably fitted in the housing, (c) a front chamber provided in front of the pressurizing piston, and (d) a rear chamber provided at a rear of the pressurizing piston;

a rear-hydraulic-pressure control device comprising a power hydraulic pressure source operable by a supply of electric power and capable of producing a high hydraulic pressure, the rear-hydraulic-pressure control device being configured to control a hydraulic pressure in the rear chamber to bring the hydraulic pressure in the rear chamber closer to a target hydraulic pressure;

a rear-hydraulic-pressure detection device configured to detect the hydraulic pressure in the rear chamber; and a liquid leakage detector configured to detect a liquid leakage from a portion including the front chamber in a case where a state in which an actual rear hydraulic pressure that is a value detected by the rear-hydraulic-pressure detection device is less than the target hydraulic pressure by a value equal to or greater than a first set value has continued for a time equal to or greater than a set length of time.

In a case where the rear-hydraulic-pressure detection device is normal, and it has already been found that there is no liquid leakage near the rear chamber, when a state in which the value obtained by subtracting the actual rear hydraulic pressure from the target hydraulic pressure is less than the first set value has continued for a time equal to or longer than the set length of time, it is possible to detect that there is a liquid leakage from a portion including the front chamber.

The portion including the front chamber includes: the front chamber; a liquid passage connected to the front chamber; and a hydraulic actuator connected to the liquid passage.

The present hydraulic-pressure producing device can adapt any of the technical features in the forms (1) through (29).

(31) A malfunction detection device configured to detect presence or absence of a malfunction in a hydraulic-pressure producing device, the hydraulic-pressure producing device comprising:

a cylinder comprising (a) a housing, (b) a pressurizing piston fluid-tightly and slidably fitted in the housing, (c) a front chamber provided in front of the pressurizing piston, and (d) a rear chamber provided at a rear of the pressurizing piston; and a rear-hydraulic-pressure control device comprising a power hydraulic pressure source operable by a supply of electric power and capable of producing a high hydraulic pressure, the rear-hydraulic-pressure control device being configured to control a hydraulic pressure in the rear chamber to bring the hydraulic pressure in the rear chamber closer to a target hydraulic pressure, the malfunction detection device comprising:

a rear-hydraulic-pressure detection device configured to detect an actual hydraulic pressure in the rear chamber; and a liquid leakage detector configured to detect presence or absence of a leakage of working liquid from the front chamber, based on an actual rear hydraulic pressure that is a value detected by the rear-hydraulic-pressure detection device.

The present malfunction detection device can be mounted on the hydraulic-pressure producing device and the hydraulic brake system according to any one of (1) through (30).

BRIEF DESCRIPTION OF THE DRAWINGS

FIG. 3(a) is a view illustrating a change in an actual rear hydraulic pressure in a case where the hydraulic brake system is normal.

FIG. 3(b) is a view illustrating a change in the actual rear hydraulic pressure in the event of a liquid leakage from a brake line.

EMBODIMENTS OF THE INVENTION

Figure 1:
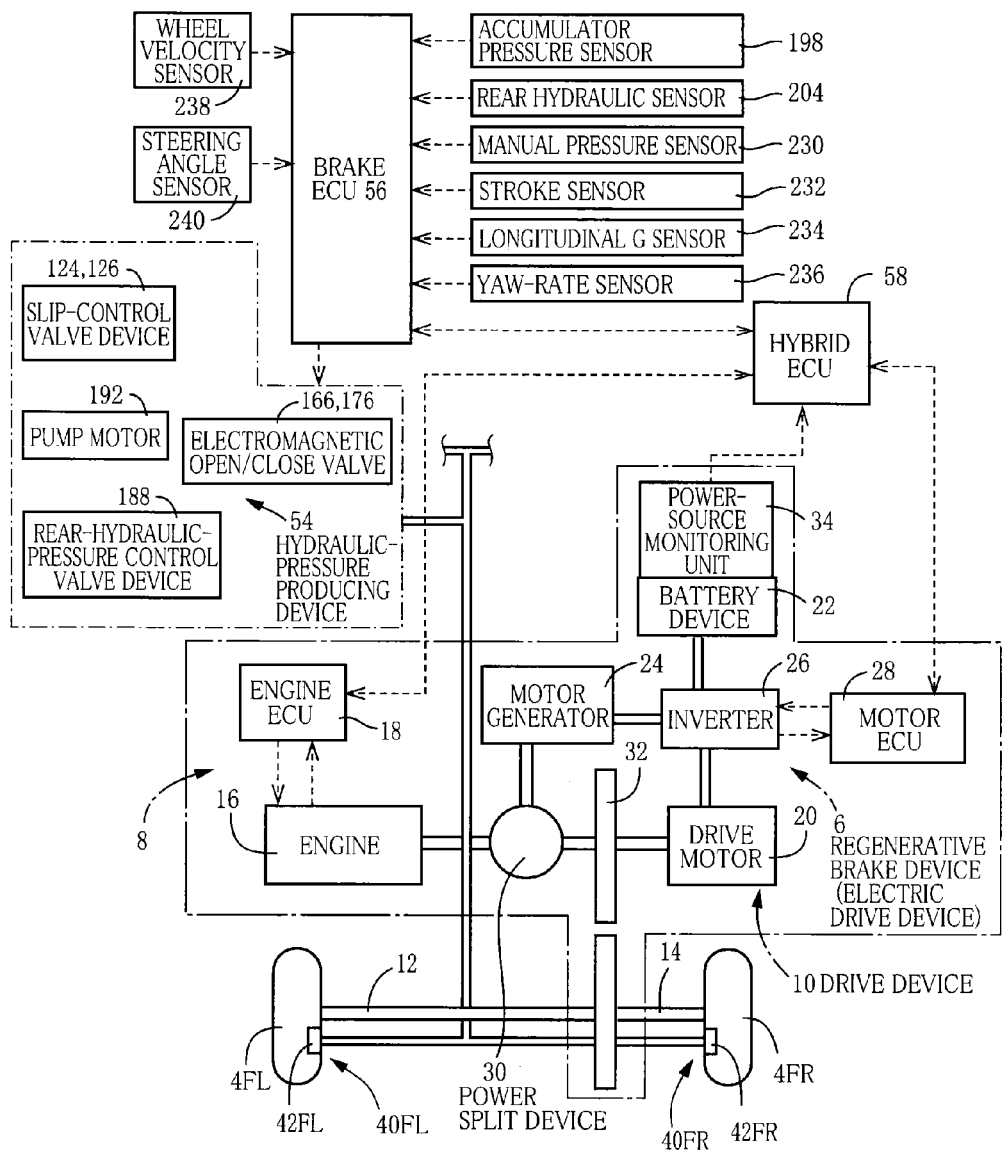
FIG. 1 is a view illustrating an overall structure of a vehicle provided with a hydraulic brake system according to an embodiment 1 of the present invention. The present hydraulic brake system includes a hydraulic-pressure producing device according to an embodiment of the present invention.

Hereinafter, there will be described hydraulic brake systems according to embodiments of the present invention by reference to the drawings. Each hydraulic brake system includes a hydraulic-pressure producing device according to one of embodiments according to the present invention.

Embodiment 1

<Vehicle>

The present hydraulic brake system is mounted in a hybrid vehicle (including a plug-in hybrid vehicle). In this hybrid vehicle, front left and right wheels 4FL, 4FR as drive wheels are driven by a drive device 10 that includes an electric drive device 6 and an internal-combustion drive device 8. A driving force produced by the drive device 10 is transmitted to the front left and right wheels 4FL, 4FR via drive shafts 12, 14, respectively. The internal-combustion drive device 8 includes an engine 16 and an engine ECU 18 configured to control an operating state of the engine 16. The electric drive device 6 includes a drive motor (hereinafter may be simply referred to as "electric motor") 20, a battery device 22, a motor generator 24, an inverter 26, a drive motor ECU (hereinafter may be simply referred to as "motor ECU) 28. The engine 16, the electric motor 20, and the motor generator 24 are coupled to a power split device 30. The flow of the force or power is switched by this power split device 30 so that only a driving force produced by the electric motor 20 is transmitted to an output member 32, or both a driving force produced by the engine 16 and the driving force produced by the electric motor 20 are transmitted to the output member 32, or the driving force produced by the engine 16 is transmitted to both the motor generator 24 and the output member 32, for example. The output member 32 is one component of a decelerator, and the driving force of the drive device 10 is transmitted to the drive shafts 12, 14 via the decelerator and differential gears. The output member 32 is one component of a speed reducer, and the driving force produced by the drive device 10 is transmitted to the drive shafts 12, 14 via the speed reducer and differential gears.

The inverter 26 is controlled by the motor ECU 28 to selectively establish one of at least a driving state and a charging state. The driving state is a state in which the electric motor 20 is rotated by electric energy supplied from the battery device 22, and the charging state is a state in which the electric motor 20 is operated as a generator during regenerative braking to store electric energy into the battery device 22. In the electric charging state, a regenerative braking force is applied to the front left and right wheels 4FL, 4FR. In this sense, the electric drive device 6 can be called a regenerative braking device.

The battery device 22 may be equipped with a nickel-metal hydride cell or a lithium ion cell, for example. A power-source monitoring unit 34 obtains information about the charging state of the battery device 22. The hydraulic brake system includes: brake cylinders 42FL, FR of hydraulic brakes 40FL, FR provided respectively for the front left and right wheels 4FL, 4FR; brake cylinders 52RL, RR of hydraulic brakes 50RL, RR provided respectively for rear left and right wheels 46RL, RR (see FIG. 2); and a hydraulic-pressure producing device 54 capable of supplying a hydraulic pressure to these brake cylinders 42FL, FR, 52RL, RR. The hydraulic-pressure producing device 54 is controlled by a brake ECU 56 constituted mainly by a computer.

Also, the vehicle is equipped with a hybrid ECU 58. The hybrid ECU 58, the brake ECU 56, the engine ECU 18, the motor ECU 28, and the power-source monitoring unit 34 can communicate with each other to transmit and receive information as needed.

It is noted that the present hydraulic brake system is installable not only on the above-described vehicle but also electric vehicles and fuel-cell vehicles, for example. The electric vehicles are not equipped with the internal-combustion drive device 8. In the fuel-cell vehicles, the drive motor is driven by a fuel cell stack, for example.

The present hydraulic brake system is also installable on internal combustion vehicles. The internal combustion vehicles are not equipped with the electric drive device 6. In such vehicles, the regenerative braking force is not applied to the drive wheels 4FL, FR, so that a regenerative cooperative control is not executed.

<Structure of Hydraulic Brake System>

Figure 2:
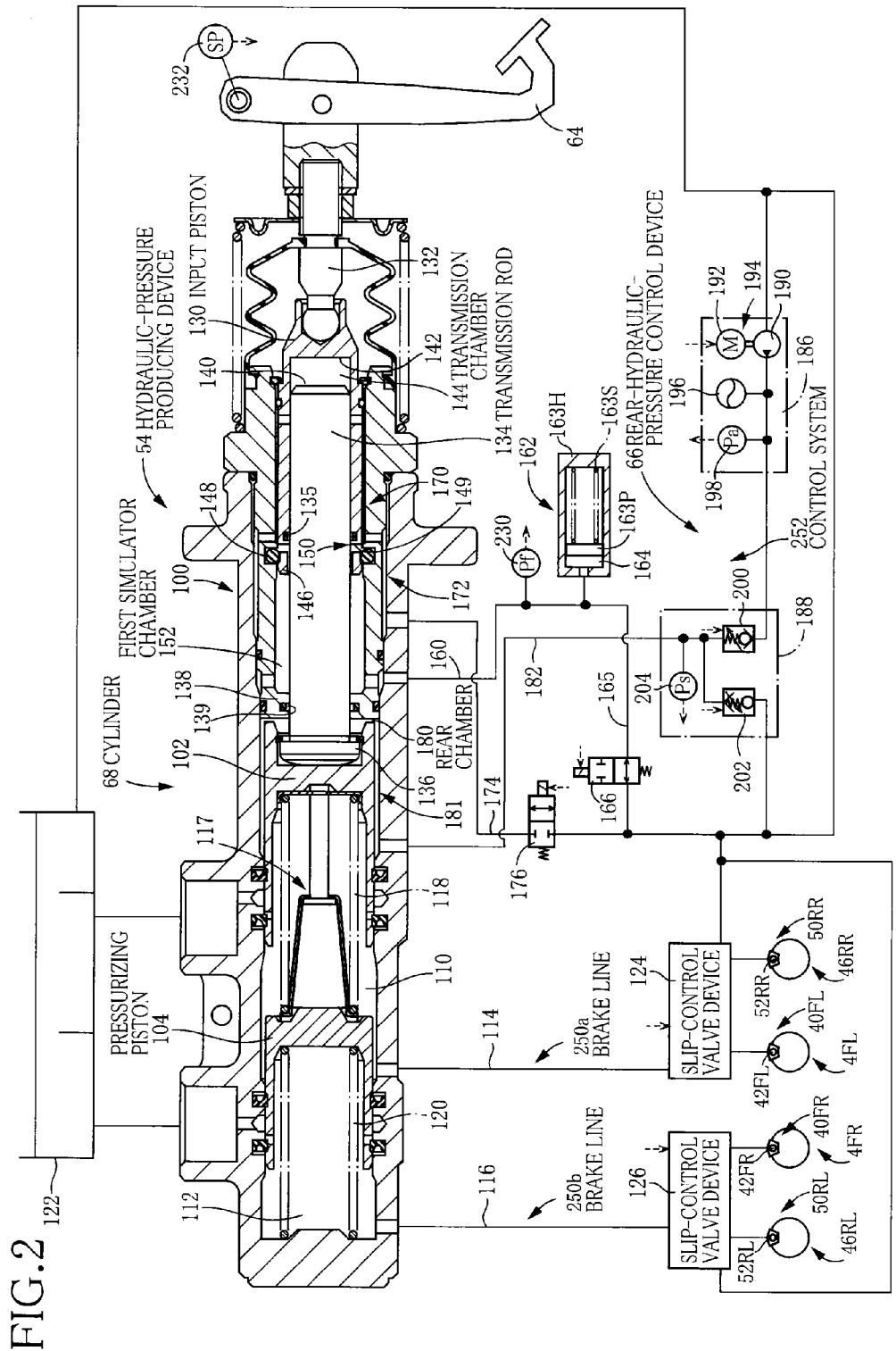
FIG. 2 is a brake hydraulic circuit diagram of the hydraulic brake system.

The hydraulic brake system installed on the vehicle will be explained with reference to FIG. 2.

The hydraulic brake system includes the brake cylinders 42FL, FR, 52RL, RR and the hydraulic-pressure producing device 54. The hydraulic-pressure producing device 54 is also a cylinder device.

The hydraulic-pressure producing device 54 serves as a manual hydraulic-pressure producing device and a power hydraulic-pressure producing device and includes: a brake pedal 64 as a brake operating member; a rear-hydraulic-pressure control device 66 as a rear-force control device; and a cylinder 68.

The cylinder 68 includes a housing 100 and two pressurizing pistons 102, 104 fluid-tightly and slidably fitted in the housing 100.

Located in front of the respective pressurizing pistons 102, 104 are pressure chambers 110, 112 each as a front chamber. The X configuration is used in the hydraulic brake system according to the present embodiment, and the brake cylinders 42FL, 52RR of the hydraulic brakes 40FL, 50RR for the front left wheel 4FL and the rear right wheel 46RR are coupled to the pressure chamber 110 via a liquid passage 114. The brake cylinders 42FR, 52RL of the hydraulic brakes 40FR, 50RL for the front right wheel 4FR and the rear left wheel 46RL are coupled to the pressure chamber 112 via a liquid passage 116.

These hydraulic brakes 40FL, FR, 50RL, RR are operated by hydraulic pressures in the respective brake cylinders 42FL, FR, 52RL, RR to restrain rotations of the respective wheels 4FL, FR, 46RL, RR.

It is noted that the II configuration (i.e., the front-axle/rear-axle configuration) may be used in the hydraulic brake system.

A distance limiter 117 is provided between the two pressurizing pistons 102, 104 to limit a distance between the two pressurizing pistons 102, 104. A return spring 118 is disposed between the two pressurizing pistons 102, 104, and a return spring 120 is between the pressurizing piston 104 and the housing 100. A slip-control valve device 124 is provided between: the pressure chamber 110 and a reservoir 122; and the brake cylinders 42FL, 52RR, and a slip-control valve device 126 is provided between: the pressure chamber 112 and the reservoir 122; and the brake cylinders 42FR, 52RL. Each of the slip-control valve devices 124, 126 includes a plurality of electromagnetic valves.

An input piston 130 is fluid-tightly and slidably fitted in the housing 100. The input piston 130 has a closed end and generally has a cylindrical shape. The brake pedal 64 is coupled to a retraction-side bottom portion of the input piston 130 via an operating rod 132, a transmission rod 134 is fluid-tightly and slidably fitted in an advance-side portion of the input piston via a seal member 135 on an opening-side of the piston. The transmission rod 134 is generally shaped like a rod and has: a head 136 immovably fitted in a rear end portion of the pressurizing piston 102; and an intermediate portion fluid-tightly and slidably held via a seal member 139 by an annular partition wall (corresponding to a holder) 138 fixed to the housing 100. When the input piston 130 is located at its retracted end position, a retraction end face 140 of the transmission rod 134 and a bottom face 142 of the input piston 130 are spaced apart from each other, and a transmission chamber 144 is defined by an inner face of the cylindrical portion of the input piston 130 and the retraction end face 140 of the transmission rod 134.

Disposed in front of the cylindrical portion of the input piston 130 is an annular holder 146 that is movable relative to the transmission rod 134 and the housing 100, and a seal member 148 is held by the holder 146 and the housing 100. When the input piston 130 is located at the retracted end position, a clearance 150 is formed between a front end face 149 of the input piston 130 and the holder 146.

Also, a first simulator chamber 152 is a space located in front of the holder 146 and enclosed by an outer circumferential surface of the transmission rod 134, an inner circumferential surface of the housing 100, and the partition wall 138.

In the present embodiment, a stroke simulator 162 is connected to the first simulator chamber 152 via a liquid passage 160. The stroke simulator 162 includes a cylinder body 163H, a piston 163P, and a spring 163S. The stroke simulator 162 has a second simulator chamber 164 located on an opposite side of the piston 163P from the spring 163S, and this second simulator chamber 164 communicates with the liquid passage 160. The first simulator chamber 152 and the second simulator chamber 164 constitutes a simulator chamber of the stroke simulator 162, and a hydraulic pressure in the simulator chamber moves the piston 163P, causing elastic deformation of the spring 163S. This action applies a reaction force to the input piston 130, so that the brake pedal 64 receives a reaction force related to a force of operation of the brake pedal 64. Thus, the hydraulic pressure in the simulator chamber has a magnitude related to the operating force applied to the brake pedal 64.

The stroke simulator 162 is coupled to the reservoir 122 via a liquid passage 165 in which a reservoir communication valve 166 is provided. The reservoir communication valve 166 is a normally-open electromagnetic open/close valve that is in its open state when no current is supplied to its solenoid.

When the input piston 130 is located at the retracted end position, the first simulator chamber 152 and the transmission chamber 144 are fluidically coupled to each other by the clearance 150 and a communication passage 170.

The transmission chamber 144 is coupled to the reservoir 122 via the communication passages 170, 172 and a liquid passage 174, i.e., by bypassing the first simulator chamber 152. A reservoir cut-off valve 176 is provided in the liquid passage 174. The reservoir cut-off valve 176 is a normally-closed electromagnetic open/close valve that is in its closed state when no current is supplied to its solenoid.

A rear chamber (a rear hydraulic pressure chamber) 180 is formed in front of the partition wall 138 of the housing 100 and at a rear of the pressurizing piston 102. The rear chamber 180 is isolated from the first simulator chamber 152 by the seal member 139. The rear-hydraulic-pressure control device 66 is coupled to the rear chamber 180 via a communication passage 181 and a liquid passage 182.

The rear-hydraulic-pressure control device 66 includes a power hydraulic pressure source 186 and a rear-hydraulic-pressure control valve device 188.

The power hydraulic pressure source 186 includes an accumulator 196 and a pump device 194 that includes a pump 190 and a pump motor 192. A hydraulic pressure in the accumulator 196 is detected by an accumulator pressure sensor 198.

The pump motor 192 is operated (started and stopped) such that a hydraulic pressure of working liquid stored in the accumulator 196 is kept within a predetermined range.

The rear-hydraulic-pressure control valve device 188 includes a pressure-buildup linear valve 200 and a pressure-reduction linear valve 202. The pressure-buildup linear valve 200 is provided between the power hydraulic pressure source 186 and the rear chamber 180, and the pressure-reduction linear valve 202 is provided between the reservoir 122 and the rear chamber 180. Each of the pressure-buildup linear valve 200 and the pressure-reduction linear valve 202 is capable of successively controlling a hydraulic pressure in the rear chamber 180 by successive control of an amount of current to be supplied to a solenoid of each valve. This amount of current to be supplied to the solenoid is controlled such that an actual rear hydraulic pressure that is a value detected by a rear hydraulic sensor 204 for detecting the hydraulic pressure in the rear chamber 180 is brought closer to a target hydraulic pressure. The pressure-buildup linear valve 200 is a normally-closed electromagnetic valve that is in its closed state when no current is supplied to its solenoid. The pressure-reduction linear valve 202 is a normally-open electromagnetic valve that is in its open state when no current is supplied to its solenoid. In the present embodiment, each of the pressure-buildup linear valve 200 and the pressure-reduction linear valve 202 corresponds to an electromagnetic valve.

The components such as the pressure-buildup linear valve 200, the pressure-reduction linear valve 202, the pump motor 192, the electromagnetic open/close valves 166, 176, and the slip-control valve devices 124, 126 are controlled based on commands supplied from the brake ECU 56 (see FIG. 1). Components coupled to the brake ECU 56 include: the accumulator pressure sensor 198; the rear hydraulic sensor 204; a manual pressure sensor 230 for detecting a hydraulic pressure in the first simulator chamber 152; a stroke sensor 232 for detecting a stroke of the brake pedal 64; a longitudinal G sensor 234 for detecting a deceleration of the vehicle in its longitudinal direction; a yaw-rate sensor 236 for detecting an angular velocity of the vehicle about a vertical axis; a wheel velocity sensor 238 for detecting a velocity of rotation of each wheel; and a steering angle sensor 240 for detecting a steering angle of a steering wheel, not shown. Based on commands supplied from the hybrid ECU 58, the brake ECU 56 controls the hydraulic pressure in the rear chamber 180 and controls the slip-control valve devices 124, 126 to control hydraulic pressures in the respective brake cylinders 42FL, FR, 52RL, RR provided for the respective wheels 4FL, FR, 46RL, RR. The storage of the brake ECU 56 stores various data such as tables and programs.

<Operations of Hydraulic Brake System>

When the hydraulic brake system is normal, and the regenerative cooperative control is executed, the open state of the reservoir cut-off valve 176 and the closed state of the reservoir communication valve 166 are established. When the input piston 130 is located at the retracted end position, the transmission chamber 144 and the first simulator chamber 152 are fluidically coupled with each other and with the reservoir 122.

When the input piston 130 is advanced relative to the transmission rod 134, the front end face 149 is brought into contact with the holder 146, and the holder 146 is advanced. The seal member 148 is pressed against the housing 100 by an outer circumferential surface of the cylindrical portion of the input piston 130, so that the first simulator chamber 152 is decoupled from the transmission chamber 144 by the seal members 148, 135. With the advance of the input piston 130, the working liquid stored in the first simulator chamber 152 is supplied to the second simulator chamber 164, and a reaction force related to an urging force of the spring 163S is applied to the brake pedal 64.

Since the transmission chamber 144 has been fluidically coupled with the reservoir 122, the input piston 130 is allowed to move relative to the transmission rod 134.

Since the rear chamber 180 is isolated from the first simulator chamber 152, the hydraulic pressure in the rear chamber 180 is controlled independently of the hydraulic pressure in the first simulator chamber 152.

The pressurizing pistons 102, 104 are advanced by the hydraulic pressure in the rear chamber 180, and a hydraulic pressure related thereto is produced in the pressure chambers 110, 112. The hydraulic pressure in the pressure chambers 110, 112 is supplied to the brake cylinders 42, 52 via the liquid passages 114, 116. This state is one mode of a power operating state, and the hydraulic-pressure producing device 54 serves as the power hydraulic-pressure producing device.

Figure 4:
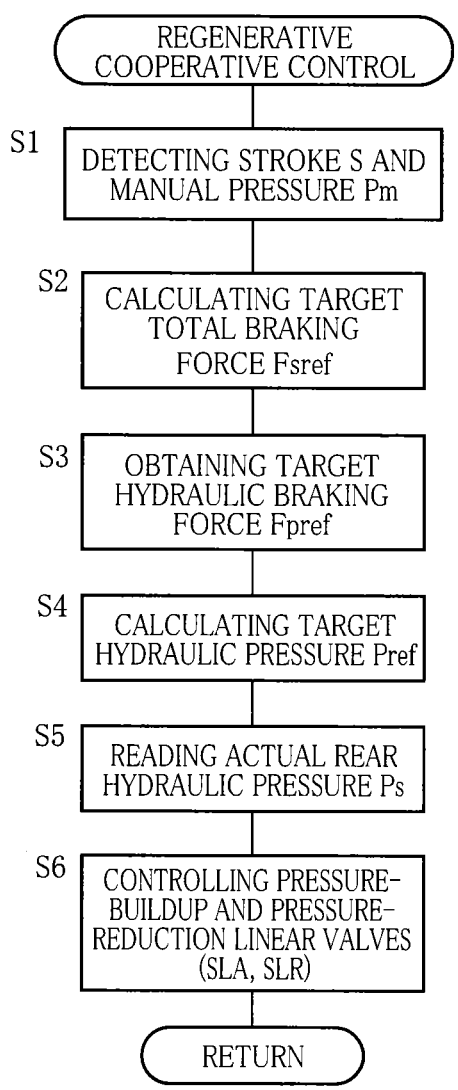
FIG. 4 is a flow chart illustrating a regenerative cooperative control program stored in a storage of a brake ECU of the hydraulic brake system.

The regenerative cooperative control is executed by execution of a regenerative cooperative control program represented by a flow chart in FIG. 4. The regenerative cooperative control program is executed each time when a set length of time predetermined by the brake ECU 56 is elapsed.

At Step 1 (hereinafter abbreviated as "S1", and this applies to the other Steps), an operating stroke Sp of the brake pedal 64 which is detected by the stroke sensor 232 and a manual pressure Pf (corresponding to a brake operating force) detected by the manual pressure sensor 230 are obtained. At S2, a target total braking force Fsref is determined based on at least one of the operating stroke Sp and the manual pressure Pf. Information representative of the target total braking force Fsref is supplied to the hybrid ECU 58.

The hybrid ECU 58 sends the motor ECU 28 information representative of the target total braking force Fsref. The motor ECU 28 controls the inverter 26 based on the target total braking force Fsref and sends the hybrid ECU 58 information representative of a regenerative braking force Fm actually obtained. The hybrid ECU 58 determines a target hydraulic braking force Fpref based on the target total braking force Fsref and the actual regenerative braking force Fm and sends the brake ECU 56 information representative of the target hydraulic braking force Fpref.

At S3 and S4, the brake ECU 56 determines a target hydraulic pressure Pref that is a target value of the hydraulic pressure in the rear chamber 180, such that the target hydraulic braking force Fpref is obtained. At S5, an actual rear hydraulic pressure Ps that is a value detected by the rear hydraulic sensor 204 is obtained. At S6, the rear-hydraulic-pressure control valve device 188 is controlled such that the actual rear hydraulic pressure Ps is brought closer to the target hydraulic pressure Pref.

Thus, when the pressurizing piston 102 is advanced by the control for the hydraulic pressure in the rear chamber 180 (hereinafter may be abbreviated as "rear hydraulic pressure"), the transmission rod 134 is also advanced accordingly. Meanwhile, the input piston 130 is advanced relative to the transmission rod 134. In the present embodiment, the rear hydraulic pressure is controlled such that a space between the bottom face 142 and the retraction end face 140 in the transmission chamber 144 does not disappear, that is, such that the input piston 130 is not brought into contact with the transmission rod 134 in the axial direction.

Also, when the hydraulic pressure is applied to the rear chamber 180 in a state in which the brake pedal 64 is not operated, the hydraulic brakes 40, 50 are actuated, so that an automatic-brake operating state is established. The automatic-brake operating state is included in the power operating state.

It is noted that where an operating force applied to the input piston 130 is further increased after the rear hydraulic pressure has reached the maximum value or where a speed of operation of the brake pedal 64 is considerably high, for example, the bottom face 142 of the input piston 130 is brought into contact with the retraction end face 140 of the transmission rod 134, so that the pressurizing piston 102 receives both of the rear hydraulic pressure and a force applied to advance the input piston 130. In the present embodiment, this state is considered to belong to a manual operating state because the input piston 130 and the transmission rod 134 are advanced together with depression of the brake pedal 64.

In the event of a malfunction in the hydraulic brake system, no current is supplied to the solenoids, so that the closed state of the reservoir cut-off valve 176 and the open state of the reservoir communication valve 166 are established. The pressure-buildup linear valve 200 is in the closed state, and the pressure-reduction linear valve 202 is in the open state.

When the input piston 130 is located at the retracted end position, the first simulator chamber 152 and the transmission chamber 144 are fluidically coupled with each other and with the reservoir 122. Also, the rear chamber 180 is fluidically coupled with the reservoir 122.

A slight advance of the input piston 130 causes the seal members 148, 135 to isolate the transmission chamber 144 from the first simulator chamber 152 as described above, so that the transmission chamber 144 is isolated from the reservoir 122. The input piston 130 is inhibited from being moved relative to the transmission rod 134, and the transmission rod 134 is advanced with the advance of the input piston 130. Since the first simulator chamber 152 is fluidically coupled with the reservoir 122, the input piston 130 is allowed to be moved or advanced relative to the housing 100. The force applied to advance the input piston 130 is transmitted to the pressurizing piston 102 via the transmission rod 134, and the input piston 130 is advanced accordingly. A hydraulic pressure related to the brake operating force is produced in the pressure chambers 110, 112 and supplied to the brake cylinders 42, 52. This state is the manual operating state, and the hydraulic-pressure producing device 54 serves as the manual hydraulic-pressure producing device.

<Overview of Detection of Presence or Absence of Malfunction>

In the present embodiment, the presence or absence of a liquid leakage from at least one of a brake line 250a and a brake line 250b is detected. The brake line 250a includes the pressure chamber 110, the liquid passage 114, and the brake cylinders 42FL, 52RR, and the brake line 250b includes the pressure chamber 112, the liquid passage 116, and the brake cylinders 42FR, 52RL. Whether the liquid leakage has occurred from the brake line 250a or 250b is not identified.

The detection of the presence or absence of the liquid leakage from the brake lines 250a, b is executed in the power operating state of the hydraulic-pressure producing device 54. Specifically, the detection is executed during the regenerative cooperative control or during the operation of the automatic brake. Hereinafter, the power operating state may be referred to as "rear-hydraulic-pressure control state".

In the case where there is no liquid leakage from the brake lines 250a, b, and the rear-hydraulic-pressure control device 66 is normal, for example, that is, the hydraulic brake system is normal, as illustrated in FIG. 3(a), the actual rear hydraulic pressure Ps is increased with an increase in the target hydraulic pressure Pref. A start of the increase in the actual rear hydraulic pressure Ps delays in some degree due to a delay of the control, but a difference between the target hydraulic pressure Pref and the actual rear hydraulic pressure Ps is small.

On the other hand, in the event of a liquid leakage from at least one of the brake lines 250a, b, the rear hydraulic pressure changes as illustrated in FIG. 3(b). Even when the pressurizing piston 102 is advanced by the supply of the working liquid into the rear chamber 180, the hydraulic pressure in the pressure chambers 110, 112 does not increase accordingly, and the hydraulic pressure in the rear-hydraulic-pressure chamber 180 does not increase appropriately, either. In this state, the actual rear hydraulic pressure Ps becomes smaller than the target hydraulic pressure Pref by an amount equal to or larger than a first set value $\Delta P1$ (hereinafter referred to as "first malfunction determination threshold value $\Delta Pth$").

When any of the pressurizing pistons 102, 104 bottoms, a reaction force increases, so that the hydraulic pressure in the rear chamber 180 is increased at a rate equal to or higher than a malfunction determination rate. As a result, the hydraulic pressure in the rear chamber 180 is brought closer to the target hydraulic pressure Pref, and an absolute value of the difference therebetween becomes smaller than a second set value ΔP2 (hereinafter referred to as "first return determination threshold value δp").

In view of the above, the presence of the liquid leakage from at least one of the brake lines 250a, b is detected in a case where a state in which the actual rear hydraulic pressure Ps is lower than the target hydraulic pressure Pref by the amount equal to or larger than the amount equal to or larger than the first malfunction determination threshold value ΔPth had continued for a time equal to or longer than a set length of time T1 (hereinafter referred to as a first malfunction determination time T1), and then the actual rear hydraulic pressure Ps has increased at a rate equal to or higher than a set rate dP.

In the present embodiment, the first malfunction determination threshold value ΔPth is determined to have such a magnitude that the actual rear hydraulic pressure Ps can be considered to be lower than the target hydraulic pressure Pref.

The first malfunction determination time T1 is set at a length of time that is longer than a response delay time. In the case where the hydraulic brake system is normal, the first malfunction determination time T1 is such a time that even if the actual rear hydraulic pressure Ps becomes lower than the target hydraulic pressure Pref by the amount equal to or larger than the first malfunction determination threshold value ΔPth due to, e.g., the delay in control, this state is considered not to be continued for a time equal to or longer than the first malfunction determination time T1. For example, the first malfunction determination time T1 can be set at a time that is longer than a normal response delay time Tr by the set length of time.

The malfunction determination rate dP can be set at a rate corresponding to a rate of increase of the hydraulic pressure in the rear chamber 180 which is caused by the bottoming of one of the pressurizing pistons 102, 104. For example, utilizing a rate determination time T2 and the first return determination threshold value δp as a value in which the actual rear hydraulic pressure Ps is considered to have gotten close to the target hydraulic pressure Pref, the malfunction determination rate dP can be determined to a value expressed by the following equation:

$$dP=(\Delta Pth-\delta p)/T2$$

The rate determination time T2 is a time which, in a case where the malfunction determination rate is achieved, extends from a timing when the actual rear hydraulic pressure Ps is lower than the target hydraulic pressure Pref by the first malfunction determination threshold value ΔPth, to a timing when the actual rear hydraulic pressure Ps has gotten closer to the first return determination threshold value δp than the target hydraulic pressure Pref. The malfunction determination rate dP is a value obtained assuming that a change of the target hydraulic pressure Pref during this period is small.

On the other hand, the state in which the actual rear hydraulic pressure Ps is lower than the target hydraulic pressure Pref by the amount equal to or larger than the first malfunction determination threshold value ΔPth may be continued due to a malfunction in a control system 252 that includes the rear-hydraulic-pressure control device 66 and the rear chamber 180. For example, in a case where the state in which the actual rear hydraulic pressure Ps is lower than the target hydraulic pressure Pref by the amount equal to or larger than the first malfunction determination threshold value ΔPth has continued for a time (Tth=Tm+α) longer than a time Tm that is required for one the pressurizing pistons 102, 104 to be bottomed, and the actual rear hydraulic pressure Ps does not increase, this situation is considered to occur due to a malfunction in the control system 252. Specifically, causes of the situation are considered to include: the liquid leakage from the rear chamber 180 and/or the liquid passage 182; a failure in the accumulator 196; a malfunction in the pump device 194; a malfunction of the pressure-buildup linear valve 200 due to sticking thereof in its closed state; and a liquid leakage from the pressure-reduction linear valve 202.

To solve these problems, in the present embodiment, a rate of flow q of the working fluid to be supplied from the rear-hydraulic-pressure control device 66 based on, e.g., a degree of opening of the pressure-buildup linear valve 200 and a hydraulic pressure difference between the rear chamber 180 and the accumulator 196 (i.e., a flow rate of the working liquid to be supplied to the rear chamber 180) is calculated and determined, and a time Tm required for an amount of the working liquid supplied to the rear chamber 180 to reach an effective capacity Qm of the pressure chambers 110, 112 (which is an amount of reduction in capacity of the pressure chambers 110, 112 until at least one of the pressurizing pistons 102, 104 is moved from the retracted end position and bottomed and which corresponds to an amount of the working fluid flowing out of the pressure chambers 110, 112) is determined, and a length of time longer than the time Tm by a time α is determined as a rear-system malfunction determination time Tth.

$$Qm=Tm \cdot q$$

$$Tth=Tm+\alpha$$

In a case where the state in which the actual rear hydraulic pressure Ps is lower than the target hydraulic pressure Pref by the amount equal to or larger than the first malfunction determination threshold value ΔPth has continued for a time equal to or longer than the rear-system malfunction determination time Tth, it is detected that there is a malfunction in the control system 252.

Since it is rare that both of the brake lines 250a, b suffer from the liquid leakage, the effective capacity Qm of the pressure chambers 110, 112 is determined on the precondition that one of the pressurizing pistons 102, 104 is bottomed.

<Executing Detection of Presence or Absence of Malfunction>

Figure 5:
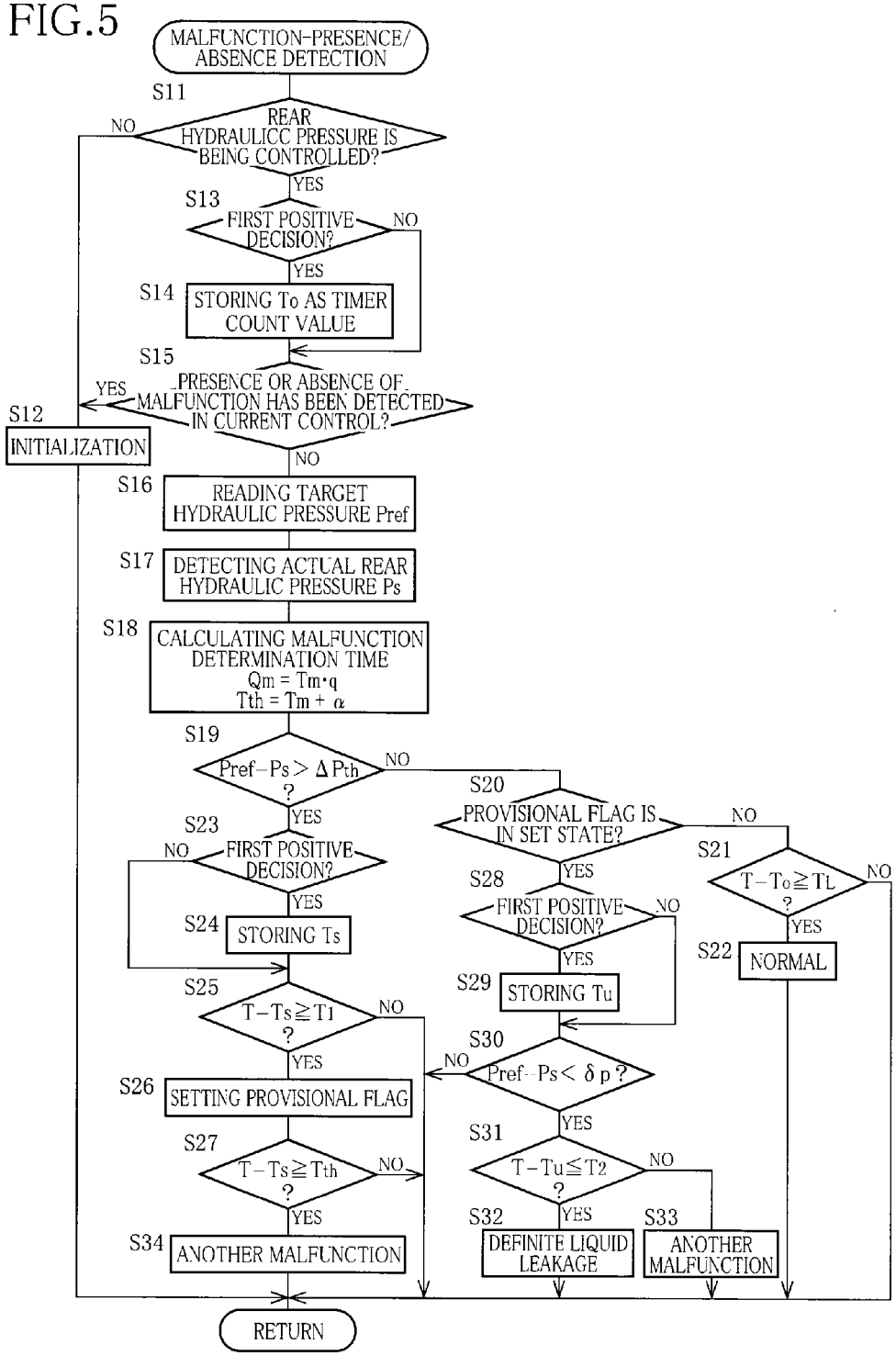
FIG. 5 is a flow chart illustrating a malfunction detection program stored in the storage.

A malfunction-presence/absence detection program illustrated in a flow chart in FIG. 5 is executed each time when a predetermined set length of time is elapsed. It is noted that since the brake ECU 56 is provided with a timer, the ECU 56 can recognize an elapse of time based on information provided by the timer.

At S11, it is determined whether the rear hydraulic pressure is being controlled or not. When the rear hydraulic pressure is not being controlled, parameters, flags, and so on used in the execution of the present program is initialized at S12.

When a control for the rear hydraulic pressure is started, a positive decision (YES) is made at S11, and it is determined at S13 whether this decision is the first positive decision made at S11 or not. When the control for the rear hydraulic pressure is not being executed previously, a positive decision (YES) is made at S13. At S14, a value To of the timer is read and stored. At S15, it is determined whether the detection of the presence or absence of the malfunction is completed in the current control for the rear hydraulic pressure or not. When the processing at S15 is executed for the first time, a negative decision (NO) is made.

At S16 and S17, the target hydraulic pressure Pref and the actual rear hydraulic pressure Ps are obtained. Determination of the target hydraulic pressure Pref depends upon the regenerative cooperative control or a request for the automatic brake, for example. At S18, the flow rate q (cc/sec) of the working liquid to be supplied to the rear chamber 180 is obtained based on, e.g., the degree of opening of the pressure-buildup linear valve 200, the rear hydraulic pressure, and the pressure in the accumulator, and the time Tm required for one of the pressurizing pistons 102, 104 to be bottomed is obtained based on the flow rate q and the effective capacity Qm of the pressure chambers 110, 112, and the rear-system malfunction determination time Tth is obtained.

At S19, it is determined that a value ΔP obtained by subtracting the actual rear hydraulic pressure Ps from the target hydraulic pressure Pref (i.e., an absolute value of the difference between the target hydraulic pressure Pref and the actual rear hydraulic pressure Ps) is greater than the first malfunction determination threshold value ΔPth or not.

$Pref-Ps>\Delta\Delta Pth$

When the subtraction value ΔP is less than the first malfunction determination threshold value ΔPth, it is determined at S20 whether a provisional flag is in a set state or not. When the provisional flag is not in the set state, it is determined at S21 whether a time limit TL has passed from the start of the control for the rear hydraulic pressure or not. The processings at S11, S13, and S15-21 are repeated before the time limit TL has passed, and when the time limit TL has passed, a positive decision (YES) is made at S21, and it is determined at S22 that there is no liquid leakage from the brake lines 250a, b, and the control system 252 is normal.

The provisional flag is a flag that is set when a state in which the subtraction value ΔP is larger than the first malfunction determination threshold value ΔPth has continued for a time equal to or longer than the first malfunction determination time T1. That is, the provisional flag is set when the liquid leakage from at least one of the brake lines 250a, b is suspected.

When the subtraction value ΔP is larger than the first malfunction determination threshold value ΔPth, on the other hand, a positive decision (YES) is made at S19, it is determined at S23 whether the subtraction value ΔP has become larger than the first malfunction determination threshold value ΔPth for the first time or not. When this decision is the first positive decision, a value Ts of the timer is read and stored at S24.

At S25, it is determined whether a length of time elapsed from the timing when the subtraction value ΔP has become larger than the first malfunction determination threshold value ΔPth has exceeded the first malfunction determination time T1 or not. Before the first malfunction determination time T1 has passed, the processings at S11, S13, S15-S19, S23, and S25 are repeated. When the state in which the subtraction value ΔP is larger than the first malfunction determination threshold value ΔPth has continued for a time equal to or longer than the first malfunction determination time T1, a positive decision (YES) is made at S25. At S26, the provisional flag is set, and it is determined at S27 whether the time has become equal to or longer than the rear-system malfunction determination time Tth or not. Before the rear system malfunction determination time Tth has passed since the subtraction value ΔP has become larger than the first malfunction determination threshold value ΔPth, the processings at S11, S13, S15-S19, S23, and S25-27 are repeated. However, when the subtraction value ΔP has become equal to or smaller than the first malfunction determination threshold value ΔPth before the rear-system malfunction determination time Tth has passed, a negative decision (NO) is made at S19. In this case, since the provisional flag is in the set state, a positive decision (YES) is made at S20, and it is determined at S28 whether this decision is the first positive decision made at S20 or not. When this decision is the first positive decision, a value Tu of the timer is read and stored at S29. It is determined at S30 whether the subtraction value ΔP has become smaller than the first return determination threshold value δp or not.

$Pref-Ps<\delta p$

When the subtraction value ΔP is equal to or larger than the first return determination threshold value δp, a negative decision (NO) is made at S30, and the processings at S11, S13, S15-S20, S28, and S30 are repeated. When the subtraction value ΔP has become smaller than the first return determination threshold value δp, it is determined at S31 whether or not a length of time (T−Tu) elapsed from the timing when the subtraction value ΔP has become equal to or smaller than the first malfunction determination threshold value ΔPth is equal to or shorter than the rate determination time T2.

That is, whether or not the actual rear hydraulic pressure Ps has increased at a rate equal to or higher than a malfunction determination rate dPth $\{=(\Delta Pth-\delta p)/T2\}$ is determined.

In a case where a rate of increase in the actual rear hydraulic pressure Ps is $\{(\Delta Pth-\delta p+\Delta Pref)/T2\}$, the increase rate is higher than the malfunction determination rate dP.

$(\Delta Pth-\delta p+\Delta Pref)/T2>dPth$

It is definitely determined at S32 that there is a liquid leakage from at least one of the brake lines 250a, b. The provisional flag is reset, and a definite flag (i.e., a liquid leakage flag) is set. When a negative decision is made at S32, it is determined at S33 that there is another type of malfunction. Also at S33, the provisional flag is reset.

When a state in which the subtraction value ΔP is equal to or larger than the first malfunction determination threshold value ΔPth has continued for a time equal to or longer than the rear-system malfunction determination time Tth, on the other hand, a positive decision (YES) is made at S27, and it is determined at S34 that there is another type of malfunction. For example, it is considered that there is a malfunction in the control system 252, for example.

Thus, in the present embodiment, the presence or absence of the liquid leakage from at least one of the brake lines 250a, b is detected based on an change in the actual rear hydraulic pressure Ps and the value ΔP obtained by subtracting the actual rear hydraulic pressure Ps from the target hydraulic pressure Pref. The presence or absence of the liquid leakage from the brake lines 250a, b can be detected not based on the hydraulic pressure in the pressure chambers 110, 112, and the presence or absence of the liquid leakage from the brake lines 250a, b can be detected not using a sensor for detecting the hydraulic pressures in the brake cylinders 42, 52 (i.e., a sensor for detecting the hydraulic pressure in the pressure chambers 110, 112).

Also, there is an advantage that the liquid leakage from the brake lines 250a, b and other malfunctions can be detected while distinguished from each other.

Furthermore, the presence or absence of the liquid leakage from the brake lines 250a, b is detected during the control for the rear hydraulic pressure, and the hydraulic-pressure producing device 54 is not operated for detecting the malfunction, resulting in reduction in energy consumed for detecting the malfunction.

In the present embodiment as described above, the rear force corresponds to the rear hydraulic pressure as the hydraulic pressure in the rear chamber 180, and the rear hydraulic sensor 204 corresponds to a rear-hydraulic-pressure detection device as a rear-force detection device.

Also, portions of the brake ECU 56 which store and execute the malfunction-presence/absence detection program illustrated in the flow chart in FIG. 5, and so on constitute a malfunction detection device. Portions of the brake ECU 56 which store and execute the processing at S11-S21 and S23-S32 of the malfunction-presence/absence detection program, and so on constitute a liquid-leakage-presence/absence detection device. The liquid-leakage-presence/absence detection device is also a rear-force-based detector, a pressure-difference-based detector, a rate-based detector, and a bottoming detection device. Portions of the brake ECU 56 which store and execute the processing at S16, and so on constitute a target rear force estimator. That is, the presence or absence of the liquid leakage is detected based on the difference between the actual rear hydraulic pressure and the target hydraulic pressure, and the target hydraulic pressure is set at an estimated rear hydraulic pressure.

Furthermore, portions of the brake ECU 56 which store and execute the processing at S6 of the regenerative cooperative control program illustrated in the flow chart in FIG. 4, and so on constitute an electromagnetic valve controller. This electromagnetic valve controller may be referred to as "front-hydraulic-pressure control device".

It is noted that, in the above-described embodiment, it is determined at S30 whether the subtraction value ΔP has become smaller than the first return determination threshold value δp or not, but this processing is not essential. The brake ECU may be configured such that an actual increase rate of the actual rear hydraulic pressure Ps is determined, and it is determined whether the increase rate is larger than the malfunction determination rate or not.

$$\{Ps(n)-Ps(n-1)\}/(T-Tu)>dPth$$

Thus, where the brake ECU is configured such that the increase rate is directly obtained and compared with the malfunction determination rate dPth, the presence or absence of the liquid leakage can be detected at an earlier stage. Also, even when the brake operating force is applied to the pressurizing piston 102, the detection of the presence or absence of the liquid leakage from the brake lines 250a, b can be made more reliable.

Also, the first malfunction determination threshold value ΔPth, the first malfunction determination time T1, the malfunction determination rate dPth, and so on can be determined in a manner different from that in the above-described embodiment.

For example, the first malfunction determination threshold value ΔPth can be set at a value that cannot be generated due to the delay in control. This case results in a lower need for detecting whether the first malfunction determination time T1 has passed or not.

The first malfunction determination time T1 can also be set at the time Tm required for the bottoming, or a time shorter than the time Tm required for the bottoming by a set length of time β.

The malfunction determination rate dPth can also be set at a value that cannot be generated by the control of the rear-hydraulic-pressure control device 66. In the control of the rear-hydraulic-pressure control device 66, an upper limit value of the rate of increase in the rear hydraulic pressure is usually provided, and the malfunction determination rate dPth can be set at a rate larger than the upper limit value. In this case, the malfunction determination rate dPth can be determined taking a rate of increase in the target hydraulic pressure Pref into consideration.

A starting point of each of the first malfunction determination time, the rear-system malfunction determination time, and the time limit can be set at a point in time (To) at which the control for the rear hydraulic pressure is started.

Also, the presence or absence of the liquid leakage can be determined after the components such as the rear-hydraulic-pressure control device 66 are recognized to be normal. In this case, the processings at, e.g., S27, S34, S21, and S22 are unnecessary. Regardless of the presence or absence of the processings at S27, S34, S21, and S22, the malfunction detection program of the present invention may be executed after confirming that the rear-hydraulic-pressure control device 66 is normal or may be executed without executing the confirmation. This applies to the following embodiments.

Embodiment 2

The presence or absence of the liquid leakage from the brake lines 250a, b (i.e., the presence or absence of the liquid leakage from at least one of the brake lines 250a, b) can be detected in a manner different from that in the embodiment 1.

<Overview of Detection of Presence or Absence of Malfunction>

In the embodiment 2, a length of time required for one of the pressurizing pistons 102, 104 to be bottomed (hereinafter referred to as "bottoming time") is estimated based on, e.g., a rear hydraulic pressure at a point in time when the provisional flag is set, and in a case where a difference between an estimated bottoming time and an actual bottoming time elapsed to the bottoming from the point in time when the provisional flag is set is small, the liquid leakage from at least one of the brake lines 250a, b is definitely detected.

Figure 7:
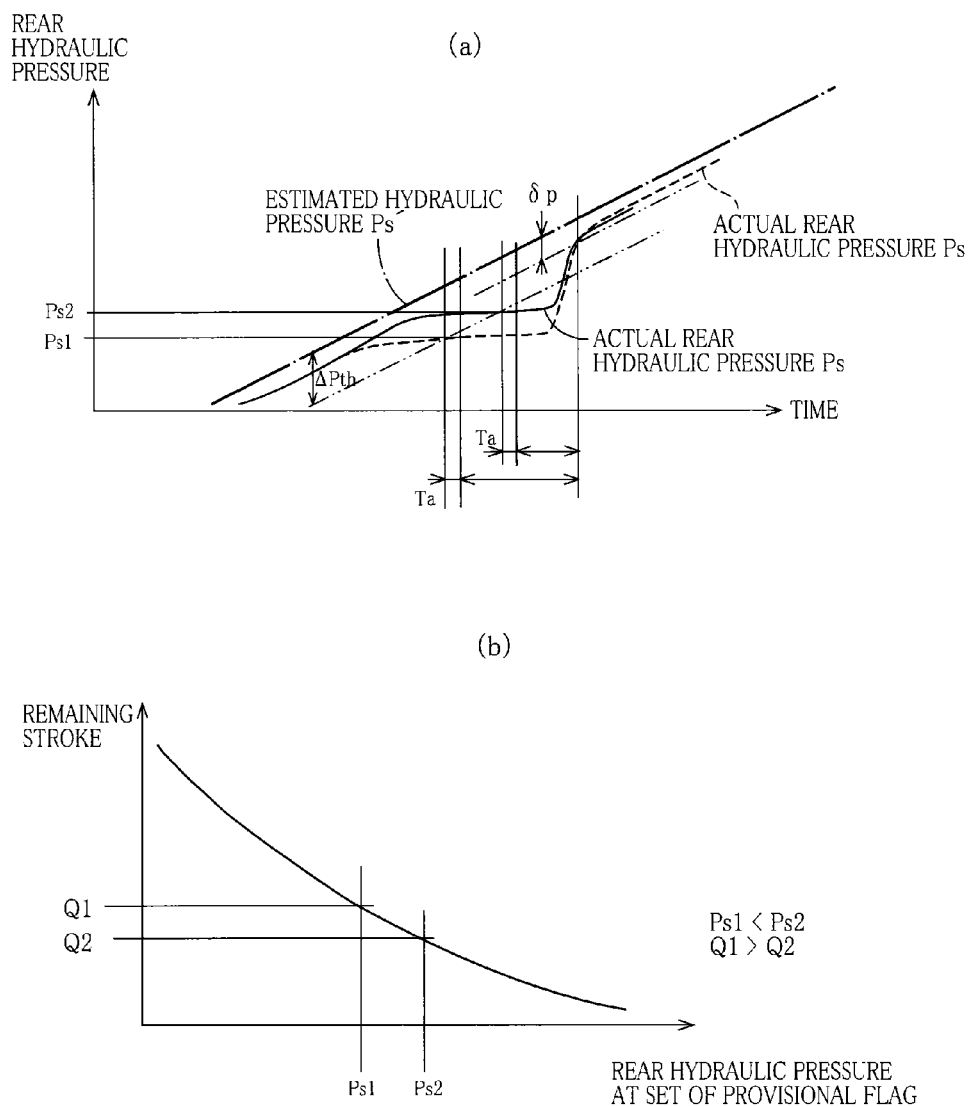
FIG. 7(a) is a view illustrating a change in an actual rear hydraulic pressure in the event of a liquid leakage from a brake line in the hydraulic brake system.
FIG. 7(b) is a view illustrating a relationship between a rear hydraulic pressure and a remaining stroke in a case where a liquid leakage is detected provisionally.

As illustrated in FIG. 7(a), a stroke of the pressurizing pistons 102, 104 from their respective retracted end positions is considered to be larger (in other words, positions of the pressurizing pistons 102, 104 relative to the housing 100 are fronter) in a case where the rear hydraulic pressure Ps at the point in time when the provisional flag is set is high than is a case where the rear hydraulic pressure Ps at the point in time when the provisional flag is set is low. Accordingly, as illustrated in FIG. 7(b), a remaining stroke required for the bottoming (i.e., a distance of movement from the point in time when the provisional flag is set to a point in time when the piston is bottomed) is smaller in the case where the rear hydraulic pressure Ps is high than in the case where the rear hydraulic pressure Ps is low, and it is estimated that the estimated bottoming time is made shorter in a case where speeds of movements of the pressurizing pistons 102, 104 are equal to each other.

In the present embodiment, a capacity increment ΔQ of the rear chamber 180 which is required for moving the pressurizing pistons 102, 104 for the remaining stroke is obtained based on the remaining stroke.

Also, the flow rate q of the working liquid into the rear chamber 180 is obtained based on, e.g., a degree of opening of a pressure-buildup control valve 200 at the point in time when the provisional flag is set and a pressure difference between the pressure in the accumulator and the rear hydraulic pressure Ps. The speeds of movements of the pressurizing pistons 102, 104 are high in a case where the flow rate q is high than in a case where the flow rate q is low.

An estimated bottoming time Ten' is obtained based on the capacity change amount ΔQ and the flow rate q.

$$Ten'=\Delta Q/q$$

Also, in the control for the rear hydraulic pressure, an estimated value Ps' of the rear hydraulic pressure is obtained based on an operation amount of the rear-hydraulic-pressure control device 66. For example, in the case where the system is normal, the rear hydraulic pressure is estimated to be higher in a case where a cumulative amount of the working liquid supplied from the power hydraulic pressure source 186 to the rear chamber 180 from the start of the control for the rear hydraulic pressure is large than in a case where the cumulative amount is small. For example, by obtaining a total sum ΣΔPa of amounts of changes ΔPa in the pressure in the accumulator, each of which is a value detected by the accumulator pressure sensor 198 from the start of the control for the rear hydraulic pressure (noted that the changes ΔPa may include increases and reductions), an amount of the working liquid supplied from the start of the control for the rear hydraulic pressure (i.e., the cumulative supply amount) can be obtained.

Also, it is estimated that the amount of the working liquid supplied to the rear chamber 180 is larger, and the hydraulic pressure is higher, in a case where an amount of current supplied to the pressure-buildup control valve 200 is large, and the degree of opening of the pressure-buildup control valve 200 is large than in a case where the amount of current supplied to the pressure-buildup control valve 200 is small, and the degree of opening of the pressure-buildup control valve 200 is small.

Thus, the sum of the amount of the working liquid supplied from the power hydraulic pressure source 186 to the rear chamber 180 and the amount of current supplied to the pressure-buildup control valve 200 (i.e., the degree of opening of the pressure-buildup control valve 200) within a period from the start of the control for the rear hydraulic pressure to the current point in time corresponds to the operation amount of the rear-hydraulic-pressure control device 66. The estimated value Ps' of the rear hydraulic pressure (i.e., the estimated rear hydraulic pressure), i.e., the rear hydraulic pressure in the case where the system is normal can be obtained based on the operation amount of the rear-hydraulic-pressure control device 66.

In the present embodiment, when a state in which a difference between the estimated rear hydraulic pressure Ps' and the actual rear hydraulic pressure Ps is larger than a second malfunction determination threshold value ΔPth has continued for a time equal to or longer than a second malfunction determination time Ta, the liquid leakage is provisionally detected, and the provisional flag is set (ON).

It is noted that, in the present embodiment, the second malfunction determination threshold value ΔPth is equal to the first malfunction determination threshold value ΔPth, and the second malfunction determination time Ta is a time which is shorter than the first malfunction determination time T1 and which permits it to be considered that the magnitude of the actual rear hydraulic pressure Ps is not generated by misdetection. The second malfunction determination time Ta may be equal to the first malfunction determination time T1 and may be set at zero.

<Executing Detection of Presence or Absence of Malfunction>

Figure 6:
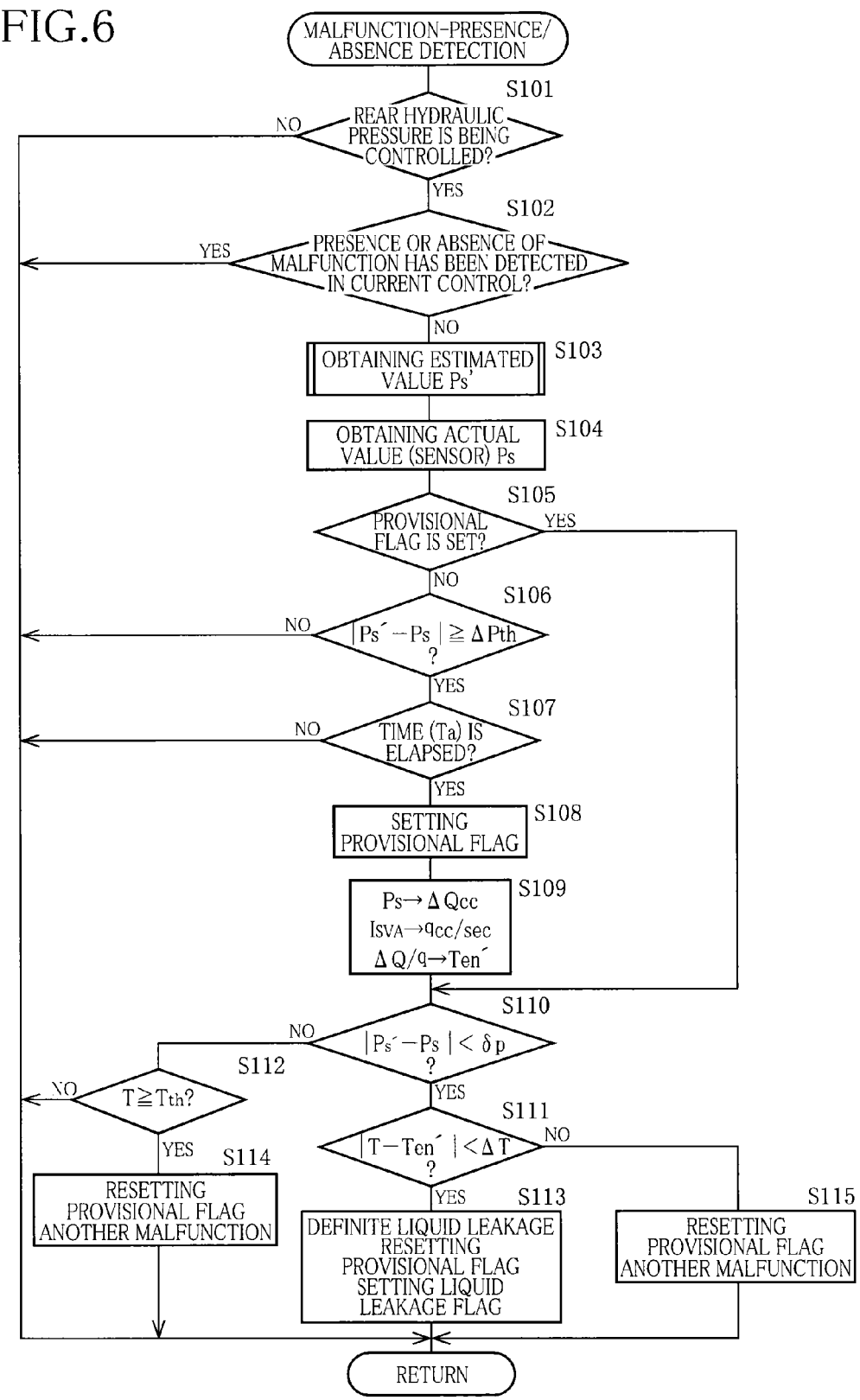
FIG. 6 is a flow chart illustrating a malfunction detection program stored in a storage of a brake ECU of a hydraulic brake system according to an embodiment 2 of the present invention.

The malfunction-presence/absence detection program illustrated in the flow chart in FIG. 6 is executed each time when a predetermined set length of time is elapsed.

It is determined at S101 whether the rear hydraulic pressure is being controlled or not, and it is determined at S102 whether the presence or absence of the malfunction has been detected in the current control or not. When the current detection is not completed, the estimated rear hydraulic pressure Ps' and the actual rear hydraulic pressure Ps are obtained at S103 and S104, respectively, and it is determined at S105 whether the provisional flag is in the set state or not. When the provisional flag is not in the set state, it is determined at S106 and S107 whether a state in which a value obtained by subtracting the actual rear hydraulic pressure Ps from the estimated rear hydraulic pressure Ps' (i.e., an absolute value of the difference between the estimated rear hydraulic pressure Ps' and the actual rear hydraulic pressure Ps) is larger than the second malfunction determination threshold value ΔPth has continued for a time equal to or longer than the second malfunction determination time Ta or not.

While omitted in the flow chart, the timer is started at the point in time when it is determined for the first time that the rear hydraulic pressure is being controlled, as in the embodiment 1. When a state in which negative decisions (NO) are made at S106 and S107 has continued for a time equal to or longer than the time limit TL, it is detected that there is no liquid leakage. When a negative decision (NO) is made at S101 or when a positive decision (YES) is made at S102, flags and parameters used in the present program are initialized.

When the liquid leakage is detected provisionally, the provisional flag is set (ON) at S108, and the estimated bottoming time Ten' is obtained at S109. It is determined at S110 whether an absolute value of a difference between the actual rear hydraulic pressure Ps and the estimated rear hydraulic pressure Ps' has become smaller than the first return determination threshold value δp or not. It is determined at S112 whether a difference between an actual elapsed time T from the point in time when the provisional flag is set and the estimated bottoming time Ten' is smaller than an estimated validity determination value ΔT or not.

That is, it is determined whether a length of time (an actual bottoming time T) required for the difference between the actual rear hydraulic pressure Ps and the estimated rear hydraulic pressure Ps to actually decrease from the point in time when the provisional flag is set is substantially equal to a length of time estimated assuming the liquid leakage (i.e., the estimated bottoming time Ten').

When the processing at S110 is executed for the first time, a negative decision (NO) is made, and it is determined at S112 whether the elapsed time T from the point in time when the provisional flag is set (S108) has exceeded the rear-system malfunction determination time Tth or not. When the processing at S112 is executed for the first time, the elapsed time T is shorter than the rear-system malfunction determination time Tth. Thus, a negative decision (NO) is made, and this flow returns to S101.

In this case, since the provisional flag is in the set state, a positive decision (YES) is made at S105, and it is determined at S110 whether the absolute value of the difference between the actual rear hydraulic pressure Ps and the estimated rear hydraulic pressure Ps' is smaller than the first return determination threshold value δp or not, using the estimated rear hydraulic pressure Ps' and the actual rear hydraulic pressure Ps obtained at S103 and S104, respectively, and then the processing at S112 is executed.

Thereafter, the processings at S101-S105, S110, and S112 are repeated until the absolute value of the difference between the estimated rear hydraulic pressure Ps' and the actual rear hydraulic pressure Ps becomes smaller than the first return determination threshold value δp. When the absolute value of the difference becomes smaller than the first return determination threshold value δp, it is determined at S111 whether the actual bottoming time T and the estimated bottoming time Ten' are substantially equal to each other or not (that is, an absolute value of a difference between the actual bottoming time and the estimated bottoming time is smaller than the estimated validity determination value or not).

When the actual bottoming time T is substantially equal to the estimated bottoming time Ten', it is definitely detected at S113 that there is a liquid leakage. The provisional flag is reset (OFF), and the liquid leakage flag is set (ON).

On the other hand, when the actual rear hydraulic pressure Ps has not gotten close to the estimated rear hydraulic pressure Ps' even when the rear-system malfunction determination time Tth is elapsed, a positive decision (YES) is made at S112, and it is determined at S114 that there is another malfunction. For example, it is considered that there is a malfunction in, e.g., the rear-hydraulic-pressure control device 66.

Also, even when a difference between the actual bottoming time T and the estimated bottoming time Ten' even when the actual rear hydraulic pressure Ps has gotten close to the estimated rear hydraulic pressure Ps', it is determined at S115 that there is another malfunction, and the provisional flag is reset (OFF). Since the actual bottoming time has greatly deviated from a time required for the bottoming which is estimated assuming the liquid leakage, the assumption of the liquid leakage is considered to be wrong.

Thus, in the present embodiment, the estimated bottoming time Ten' that is an estimated time required for any of the pressurizing pistons 102, 104 to be bottomed from the point in time when the provisional flag is set is obtained based on the actual rear hydraulic pressure Ps at the point in time when the provisional flag is set, and when an absolute value of the difference between the actual bottoming time T and the estimated bottoming time Ten' is small, it is detected that there is a liquid leakage from at least one of the brake lines 250a, b. Consequently, the detection of the presence or absence of the liquid leakage can be made more reliable. Also, since there is a small effect of a rate of change of the target rear hydraulic pressure when compared with a case where the detection is based on the change in the actual rear hydraulic pressure Ps, the detection of the presence or absence of the liquid leakage can be more reliable.

In the present embodiment as described above, portions of the brake ECU 56 which store and execute the processings at S103, S104, and S106-S108 of the malfunction detection program illustrated in the flow chart in FIG. 6, and so on constitute a provisional liquid leakage detector. Portions of the brake ECU 56 which store and execute the processing at S103 of the malfunction detection program, and so on constitute an operation-amount-based rear force estimator. Also, portions of the brake ECU 56 which store and execute the processings at S109-S111 and S113, and so on constitute a definite liquid leakage detector, and portions of the brake ECU 56 which store and execute the processing at S109, and so on constitute a bottoming time estimator.

It is not essential that, in a case where (i) the state in which the absolute value of the difference between the actual rear hydraulic pressure Ps and the estimated rear hydraulic pressure Ps' is larger than the first malfunction determination threshold value ΔPth has continued for a time equal to or longer than the second malfunction determination time Ta, and (ii) the absolute value of the difference between the actual bottoming time T and the estimated bottoming time Ten' is small, it is detected that there is a liquid leakage from at least one of the brake lines 250a, b. For example, the presence of the liquid leakage may be detected where the provisional flag is set.

In the case where the presence of the liquid leakage is detected when the above-described two conditions are satisfied, the second malfunction determination time Ta can be zero. In this case, a length of time is measured from a point in time when the absolute value of the difference between the actual rear hydraulic pressure Ps and the estimated rear hydraulic pressure Ps' has become larger than the second malfunction determination threshold value ΔPth, and the time is compared with the estimated bottoming time Ten'.

Also, a method of obtaining the estimated rear hydraulic pressure Ps' is not limited to that in the above-described embodiment. For example, the estimated rear hydraulic pressure Ps' may be the target rear hydraulic pressure Pref. Also, the estimated rear hydraulic pressure Ps' can be obtained based on the observer theories.

Also, in the control of the rear hydraulic pressure, the presence or absence of the liquid leakage can be detected in a state in which the change in the target hydraulic pressure is small. In the state in which the change in the target hydraulic pressure is small, the rear-hydraulic-pressure control device 66 is stable when compared with a state in which the change in the target hydraulic pressure is large. Thus, the presence or absence of the liquid leakage from at least one of the brake lines 250a, b can be detected more reliably.

Embodiment 3

There will be next explained another method of detecting a malfunction.

In the embodiment 3, based on a changing state of speed (i.e., velocity) of rotation of the wheel, the presence or absence of the liquid leakage is detected, and it is detected whether the liquid leakage has occurred from the brake line 250a or 250b.

<Overview of Detection of Presence or Absence of Malfunction>

In the present embodiment, the presence or absence of the malfunction is detected in a state in which the rear hydraulic pressure Ps is controlled at a fixed value (i.e., in a state in which the target hydraulic pressure Pref is fixed).

Figure 9:
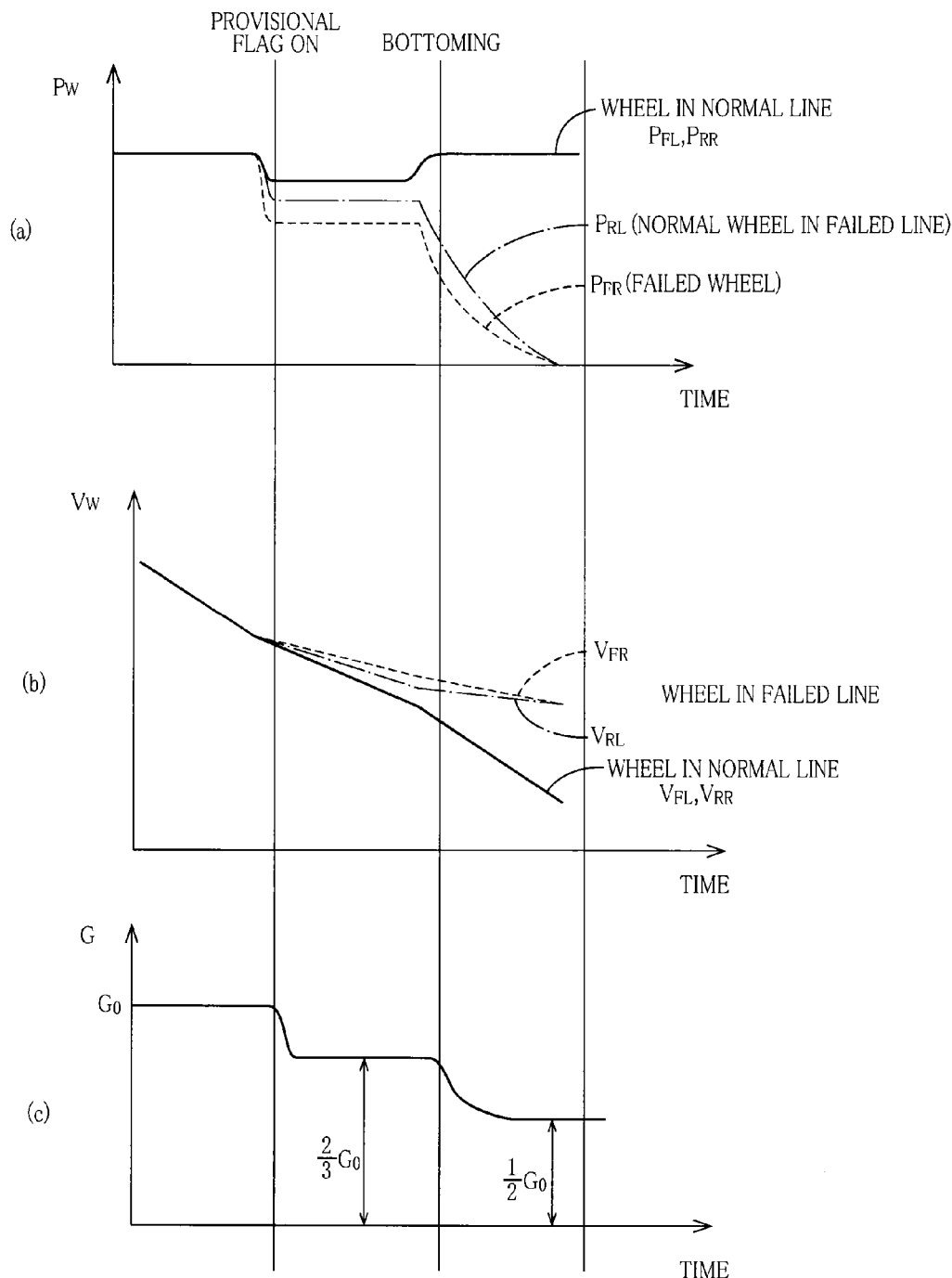
FIG. 9(a) is a view illustrating changes in hydraulic pressures in a brake cylinder of the hydraulic brake system.
FIG. 9(b) is a view illustrating changes in velocities of rotations of front left and right and rear left and right wheels of a vehicle provided with the hydraulic brake system.
FIG. 9(c) is a view illustrating a change in a deceleration of the vehicle.

As illustrated in FIG. 9, in a case where a liquid leakage has occurred from one of the brake lines 250a, b, and the other is normal, a hydraulic pressure difference occurs between a brake cylinder of a wheel of one of the brake lines and a brake cylinder of a wheel of the other of the brake lines, and accordingly a difference occurs therebetween in velocity of rotation of wheel. Thus, even when the hydraulic pressures in the brake cylinders 42, 52 are not detected, the presence or absence of the liquid leakage from one of the two brake lines 250a, b can be detected based on a difference between a rotational velocity of the wheels 4FL, 46RR on which the brake cylinders 42FL, 52RR belonging to the brake line 250a are respectively provided and a rotational velocity of the wheels 4FR, 46RL on which the brake cylinders 42FR, 52RL belonging to the brake line 250b are respectively provided.

For example, as illustrated in FIG. 9(a), in the case where the rear hydraulic pressure Ps is fixed (that is, the target rear hydraulic pressure Pref is fixed), a hydraulic pressure in the brake cylinder of the normal brake line (i.e., a hydraulic pressure in the pressure chamber) decreases with decrease in a hydraulic pressure in the brake line in which the liquid leakage has occurred, but when the piston is bottomed, the hydraulic pressure in the brake cylinder of the normal brake line returns to its original magnitude. Thus, as illustrated in FIG. 9(b), the velocity of rotation of the wheel on which the brake cylinder belonging to the normal brake line is provided decreases at a generally constant rate (that is, wheel deceleration is a generally fixed magnitude). Strictly speaking, after transiently decreased, the wheel deceleration returns to its original magnitude.

In the brake line suffering from the liquid leakage, in contrast, the hydraulic pressure in the brake cylinder decreases and becomes zero (i.e., the atmospheric pressure) depending upon a degree of the liquid leakage and a liquid-leakage suffered position. Thus, the velocity of rotation of the wheel decreases at a gentle rate (that is, the wheel deceleration becomes smaller). Also, a hydraulic pressure difference occurs also between the two brake cylinders belonging to the brake line suffering from the liquid leakage, and a difference occurs in most cases between the two wheels in rotational velocity (i.e., in wheel deceleration).

Also, vehicle deceleration decreases with decrease in a hydraulic pressure in the brake cylinder belonging to the brake line suffering from the liquid leakage. As illustrated in FIG. 9(c), the vehicle deceleration before the bottoming is about two thirds of deceleration that is determined by the rear hydraulic pressure Ps in the normal case, and the vehicle deceleration after the bottoming becomes about a half of deceleration that is determined by the rear hydraulic pressure Ps in the normal case (because the X configuration is used).

It is noted that FIG. 9 is illustrated so as to clarify transient changes of the hydraulic pressure in the brake cylinder, the velocity of rotation of the wheel, and the vehicle deceleration and, strictly speaking, these changes are different from actual changes.

<Executing Detection of Presence or Absence of Malfunction>

Figure 8:
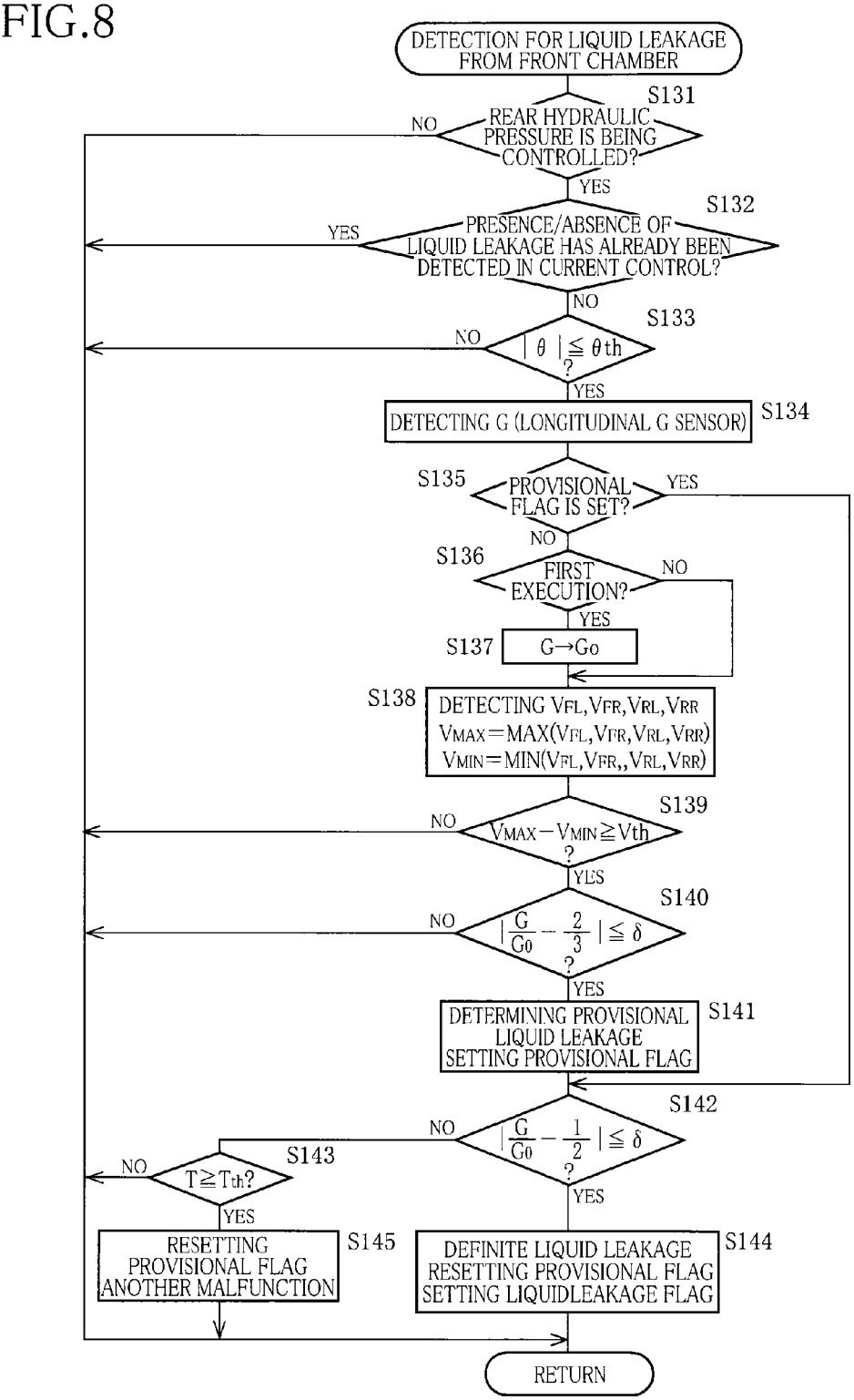
FIG. 8 is a flow chart illustrating a malfunction detection program stored in a storage of a brake ECU of a hydraulic brake system according to an embodiment 3 of the present invention.

The malfunction detection program illustrated in the flow chart in FIG. 8 is executed each time when a predetermined set length of time is elapsed.

It is determined at S131 whether the rear hydraulic pressure is being controlled or not, and it is determined at S132 whether the presence or absence of the malfunction has already been detected in the current control or not. When the rear hydraulic pressure is being controlled and when the current detection for the presence or absence of the malfunction is not completed, it is determined at S133 whether or not an absolute value |θ| of a steering angle which is a value detected by the steering angle sensor 240 is equal to or smaller than a set steering angle θth to determine whether a driver has an intention of turning or not. When the absolute value of the steering angle is equal to or smaller than the set steering angle and when the hydraulic brake system and so on are normal, the vehicle is to travel in a straight line, and a difference in rotational velocity is not to occur between left and right wheels, for example.

A longitudinal deceleration Gs (actual deceleration) that is a value detected by the longitudinal G sensor 234 is detected at S134. It is detected at S135 whether the provisional flag is in the set state (ON) or not. When the provisional flag is not in the set state (OFF), it is determined at S136 whether this processing is executed for the first time or not. When this processing is executed for the first time, the vehicle deceleration detected at S134 is determined at S137 at a vehicle deceleration Go (hereinafter referred to as "reference deceleration").

At S138, a wheel velocity Vw of each of the wheels 4FL, FR, 46RL, RR is detected to obtain a maximum value Vmax and a minimum value Vmin.

It is determined at S139 whether or not a value obtained by subtracting the minimum value Vmin from the maximum value Vmax is equal to or greater than a set velocity difference Vth. The set velocity difference Vth can be set, for example, at a value determined based on a difference in rotational velocity which can be generated in a case where a hydraulic pressure in a brake cylinder provided for one of wheels has lowered with respect to a hydraulic pressure in a brake cylinder provided for the other of the wheels due to, e.g., a liquid leakage. It is determined at S140 whether or not a value obtained by dividing an actual deceleration Gs by a reference deceleration Go (Gs/Go, hereinafter referred to as "deceleration ratio") is about ⅔ or not. Specifically, it is determined whether or not an absolute value of a difference between the deceleration ratio and ⅔ is equal to or lower than a set value δ.

Not illustrated in the flow chart, when negative decisions (NO) are made at S139 and S140, as in the case in the embodiments 1, 2, it is determined whether or not a time elapsed from a positive decision (YES) at S131 becomes equal to or longer than the time limit TL, and when the time elapsed becomes equal to or longer than the time limit TL, it is determined that the system is normal.

When negative decisions (NO) are made at S139 and S140, this flow returns to S131, and the processings at S131-S135 and S138-S139 (S140) are repeated. When the maximum value of the difference in rotational velocity between the four wheels becomes equal to or larger than the set velocity difference Vth and when the deceleration ratio becomes about ⅔, it is estimated that there is a failure in one of the two brake lines 250a, b, and the provisional flag is set at S141.

It is determined at S142 whether the deceleration ratio has become about ½ or not. Specifically, it is determined whether or not an absolute value of a difference between the deceleration ratio and ½ has become equal to or lower than the set value δ. In the present embodiment, the set value δ is equal to δ used at S140 but may be different.

When the deceleration ratio is equal to or higher than ½ by an amount equal to or larger than the set value δ, it is determined at S143 whether the rear-system malfunction determination time Tth has passed or not, and when a negative decision is made at S143, the processings at S131-S135, S142, and S143 are repeated.

When the deceleration ratio has lowered to about ½ before the rear-system malfunction determination time Tth has passed, it is definitely detected at S144 that there is a liquid leakage from one of the two brake lines 250a, b (the brake line 250a in the case illustrated in FIG. 9) in which a wheel rotates at a higher velocity (i.e., a brake line including a brake cylinder provided for a wheel whose wheel velocity is the maximum value Vmax). When the rear-system malfunction determination time Tth has passed before a positive decision (YES) is made at S143, it is detected at S145 that there is a malfunction in, e.g., the rear-hydraulic-pressure control device 66.

Thus, in the present embodiment, it is possible to identify the brake line in which the liquid leakage has occurred, based on the difference in velocity between wheels. Also, it is possible to estimate a magnitude of the hydraulic pressure in the brake cylinder without based on the hydraulic pressures in the brake lines 250a, b (the hydraulic pressure in the brake cylinder or the hydraulic pressure in the pressure chamber), making it possible to accurately detect the presence or absence of the liquid leakage.

In the present embodiment, portions of the brake ECU 56 which store and execute the processings at S138, S139, and S141 of the malfunction detection program illustrated in the flow chart in FIG. 8, and so on constitute a wheel-velocity-difference-based liquid leakage detector, and portions of the brake ECU 56 which store and execute the processings at S140 and S141, and so on constitute a deceleration-based liquid leakage detector.

It is noted that the processings at S138 and S139 may be omitted, and it may be determined whether or not an absolute value |γ| of the yaw rate of the vehicle which is detected by the yaw-rate sensor 236 is equal to or larger than a set value. When the absolute value of the yaw rate is equal to or larger than the set value, it is possible to estimate that a difference in velocity between the left and right wheels is large, and accordingly it is possible to estimate that there is a liquid leakage from one of the brake lines. In the present embodiment, it is possible to identify the brake line suffering from the liquid leakage, based on a direction of the yaw rate γ (a plus or minus of the detection value γ).

Also, a lateral acceleration can be used instead of the yaw rate.

Also, since the present invention is applied to the hydraulic brake system using the X configuration, it is estimated that the deceleration ratio in the event of a failure in one of the two brake lines becomes about ½. However, where the invention is applied to the hydraulic brake system using the II configuration and in the event of a failure in a brake line for the front wheels, it is estimated that the deceleration ratio becomes about ⅓, and in the event of a failure in a brake line for the rear wheels, it is estimated that the deceleration ratio becomes about ⅔. In a period before the bottoming, in the event of the failure in the brake line for the front wheels, the deceleration ratio becomes a value between 1 and ⅓, and in the event of the failure in the brake line for the rear wheels, the deceleration ratio becomes a value between 1 and ⅔.

Also, in the case where the wheel velocity difference is large (or in the case where the yaw rate or the absolute value of the lateral acceleration is large), the liquid leakage is detected provisionally, and in the case where the deceleration ratio has lowered, the liquid leakage is detected definitely. However, these operations are not essential. The liquid leakage may be determined in the case where the wheel velocity difference is large (or in the case where the yaw rate or the absolute value of the lateral acceleration is large) or in the case where the deceleration ratio has lowered.

Also, it does not need to detect that the deceleration ratio changes in two steps. In a case where the hydraulic brake system is normal while the rear hydraulic pressure Ps is controlled to be constant, it is possible to consider that the hydraulic pressure in the pressure chambers 110, 112 are constant, and the vehicle deceleration is also constant. When the vehicle deceleration is lowered, on the other hand, it is possible to estimate that there is a liquid leakage from at least one of the brake lines 250a, b. Likewise, the presence or absence of the liquid leakage from the brake line can be detected based on the wheel velocity of one wheel, a change in the wheel deceleration, and a change in the yaw rate.

In the present embodiment, where a yaw rate is generated in the vehicle during a normal braking operation though the driver has an intention of traveling in a straight line and where a liquid leakage is detected from one of the brake lines 250a, b, for example, the yaw-rate reduction control is executed.

In the yaw-rate reduction control, one of the two brake lines 250a, b which suffers from the failure is definitely detected, and a wheel to be controlled is determined. Then, one of the slip-control valve devices 124, 126 which corresponds to the wheel to be controlled is controlled to reduce the hydraulic pressure in the brake cylinder to reduce a difference in braking force between the left wheel and the right wheel.

Figure 10:
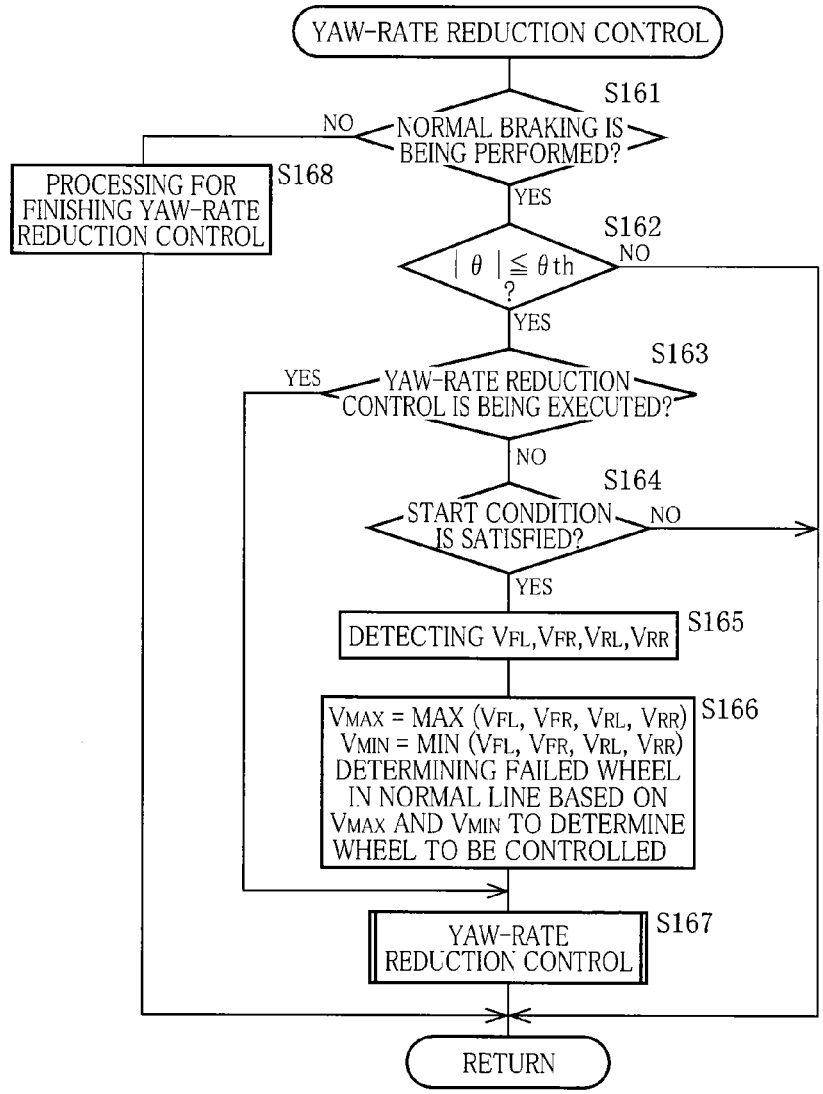
FIG. 10 is a flow chart illustrating a yaw-rate reduction control program stored in the storage of the brake ECU.

The yaw-rate reduction control program illustrated in the flow chart in FIG. 10 is executed repeatedly.

It is determined at S161 whether the normal braking operation is being performed or not. The normal braking is a braking which is performed not in an anti-lock control but in the regenerative cooperative control (i.e., in the control for the rear hydraulic pressure) or in application of the manual hydraulic pressure. It is determined at S162 whether or not an absolute value of a value A detected by the steering angle sensor 240 is equal to or smaller than the set steering angle θth, that is, it is determined whether the driver has an intention of traveling in a straight line or not. When the driver has the intention of traveling in a straight line, it is determined at S163 whether the yaw-rate reduction control is being executed or not. When the yaw-rate reduction control is not being executed, it is determined at S164 whether a condition for starting the yaw-rate reduction control is satisfied or not. The control start condition is determined to be satisfied when at least one of (i) a case where any of the provisional flag and the definite flag is set and (ii) a case where an absolute value of a value detected by the yaw-rate sensor 236 is equal to or larger than a set yaw rate is established. When any of the cases (i), (ii) is not established, the control start condition is determined not to be satisfied, and the yaw-rate reduction control is not executed.

When the condition for starting the yaw-rate reduction control is satisfied, wheel velocities VFL, FR, RL, RR of the front left and right and rear left and right wheels 4FL, FR, 46RL, RR are detected at S165. Then at S166, the maximum value Vmax and the minimum value Vmin are obtained, based on which a normal one of the brake lines 250a, b and a liquid-leakage suffered one of the brake lines 250a, b are identified. Then, a hydraulic pressure in one of the two brake cylinders belonging to the normal brake line is reduced at S167. It is noted that a liquid-leakage suffered position (i.e., a brake cylinder in which an amount of reduction in hydraulic pressure due to the liquid leakage is the largest among brake cylinders) may be identified at S166.

Figure 11:
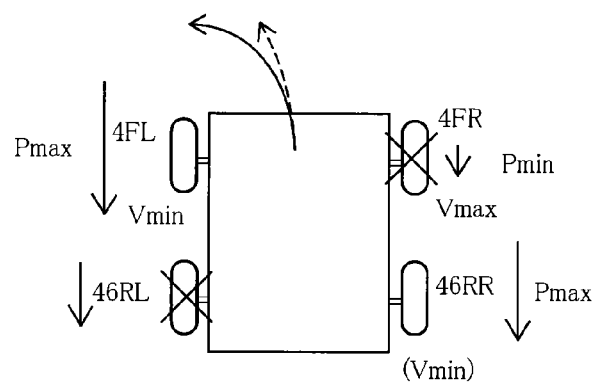
FIG. 11 is a view conceptually illustrating a yaw-rate reduction control.

For example, as illustrated in FIG. 11, in a case where the wheel velocity of the front right wheel 4FR is the highest, and the wheel velocity of the front left wheel 4FL or the rear right wheel 46RR is lowest among the wheel velocities of the four wheels, it is estimated that the brake line 250b (including the brake cylinders 42FL, 52RR provided respectively for the front left wheel 4FL and the rear right wheel 46RR, and the pressure chamber 112) is normal, and there is a liquid leakage from the brake line 250a (including the brake cylinder 42FR of the front right wheel 4FR whose wheel velocity is the highest). Also, since the rotational velocity of the front right wheel 4FR is the highest, it is estimated that the liquid-leakage suffered position is a position at which the brake cylinder 42FR of the front right wheel 4FR is affected, and it is estimated that the hydraulic pressure in the brake cylinder 42FR is the smallest. In this case, it is estimated that the sum of braking forces applied to the right wheels (i.e., the front right wheel 4FR and the rear right wheel 46RR) is smaller than the sum of braking forces applied to the left wheels (i.e., the front left wheel 4FL and the rear left wheel 46RL). As a result, the hydraulic pressure in the brake cylinder 42FL of the front left wheel 4FL is reduced, and consequently the sum of braking forces applied to the right wheels of the vehicle and the sum of braking forces applied to the left wheels of the vehicle become substantially equal to each other.

It is noted that as illustrated in FIG. 9, since the wheel velocity and the hydraulic pressure in the brake cylinder changes with a lapse of time, the wheel to be controlled is determined as needed at the timing of control to reduce the hydraulic pressure in the brake cylinder.

In a case where the present program is executed in the next time, the yaw-rate reduction control is being executed. Thus, a positive decision (YES) is made at S163, and the yaw-rate reduction control is continuously executed at S167.

Also, when the control start condition is satisfied, the yaw-rate reduction control is executed until the braking is released. Thus, the processings at S161-S163 and S167 are repeatedly executed in the normal braking operation, but when the braking is released, a negative decision (NO) is made at S161, and a processing for finishing the yaw-rate reduction control is executed at S168.

Thus, in the case where one of the two brake lines 250a, b is normal, and the other suffers from a liquid leakage, the yaw-rate reduction control is executed, resulting in reduction of lowering of running stability of the vehicle.

It is noted that the execution of the yaw-rate reduction control is not essential.

Embodiment 4

Figure 12:
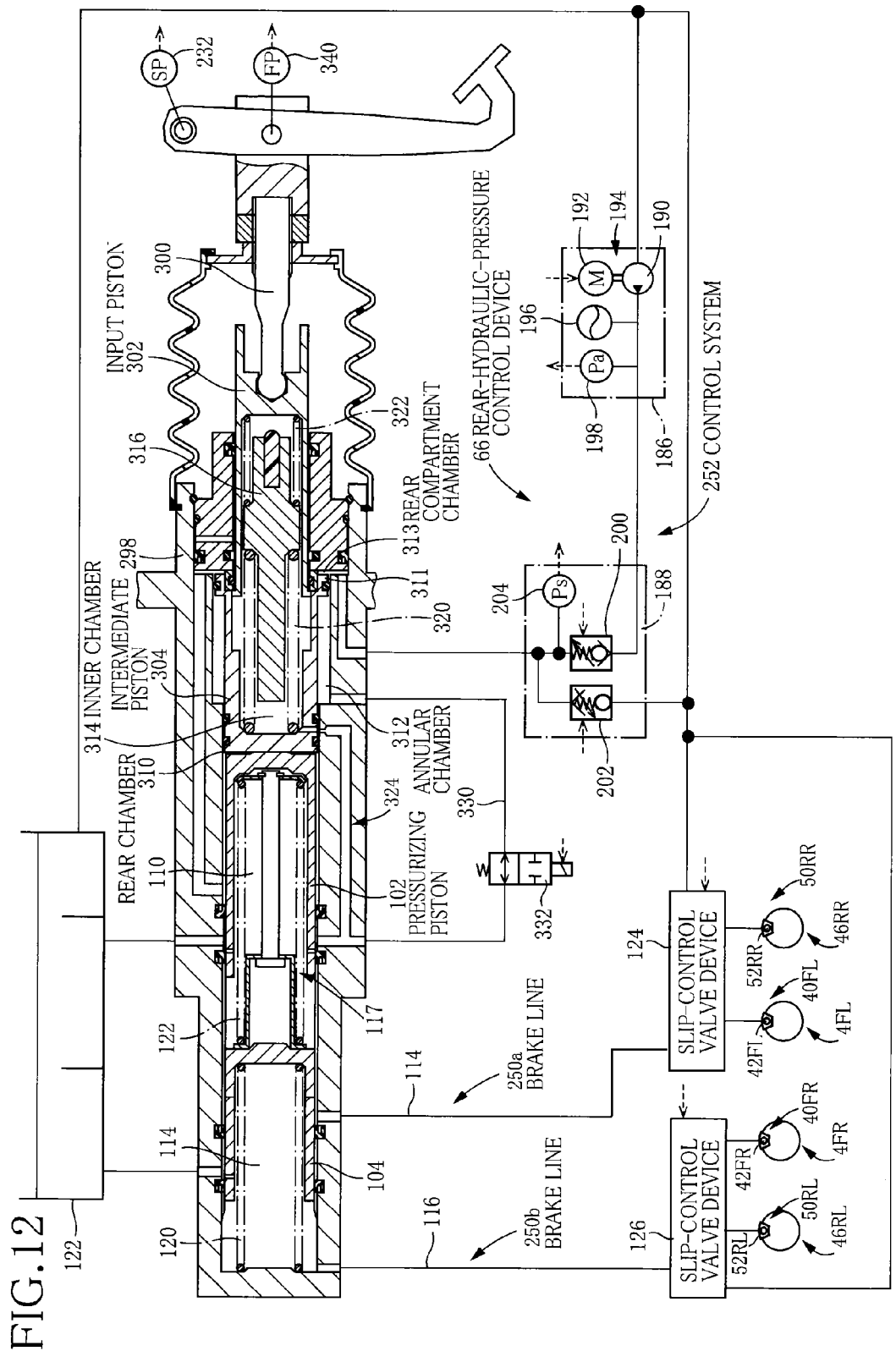
FIG. 12 is a brake hydraulic circuit diagram of a hydraulic brake system including a hydraulic-pressure producing device according to an embodiment 4 of the present invention.

It is noted that the hydraulic brake system may have any structure. For example, the present invention is applicable to a hydraulic brake system including a brake circuit illustrated in FIG. 12.

<Brake Hydraulic Circuit>

In the present embodiment, an input piston 302 connected to an operating rod 300 and an intermediate piston 304 are fluid-tightly and slidably fitted in a housing 298. Each of the input piston 302 and the intermediate piston 304 has a cylindrical shape having a bottom. The input piston 302 and the intermediate piston 304 are engaged with and movable relative to each other in a state in which their respective bottom portions face each other.

Formed between the intermediate piston 304 and the pressurizing piston 102 is a rear chamber 310. A front end face of the bottom portion of the intermediate piston 304 is a pressure receiving surface that faces the rear chamber 310.

A flange 311 is provided on a rear end portion of a cylindrical portion of the intermediate piston 304. An annular chamber 312 is formed by an outer circumferential surface of the cylindrical portion of the intermediate piston 304, the flange 311, and an inner circumferential surface of the housing 298. A fluid chamber at a rear of the flange 311 communicates with the rear chamber 310 and receives a hydraulic pressure in the rear chamber 310. Thus, the fluid chamber at a rear of the flange 311 will be referred to as a rear compartment chamber 313.

Formed between the intermediate piston 304 and the input piston 302 is an inner chamber 314 in which a floating piston 316 is provided. The floating piston 316 is supported by a pair of springs 320, 322. The spring 320 is provided between the intermediate piston 304 and the floating piston 316, and the spring 322 is provided between the input piston 302 and the floating piston 316.

The inner chamber 314 communicates with the reservoir 122 via a communication passage 324, and the annular chamber 312 is connected to the reservoir 122 by a liquid passage 330. Provided in the liquid passage 330 is a communication control valve 332 that is in its open state when no current is supplied to its solenoid.

The rear-hydraulic-pressure control device 66 is connected to the rear chamber 310 as in the above-described embodiment.

An operating-force sensor 340 for detecting a brake operating force applied to the brake pedal 64 is provided for the brake pedal 64 and connected to the brake ECU 56.

<Operation of Hydraulic Brake System>

In the case where the hydraulic brake system is normal, the communication control valve 332 is in its closed state. The annular chamber 312 is isolated from the reservoir 122, inhibiting the intermediate piston 304 from advancing. Since the inner chamber 314 communicates with the reservoir 122, the input piston 302 is allowed to move relative to the intermediate piston 304. An advance of the input piston 302 advances the floating piston 316, so that the springs 320, 322 are elastically deformed. As a result, a reaction force is applied to the brake pedal 64. A stroke simulator is constituted by the floating piston 316, the springs 320, 322, and so on.

The hydraulic pressure in the rear chamber 310 is controlled by the rear-hydraulic-pressure control device 66. In the regenerative cooperative control, the target hydraulic pressure is determined based on at least one of a value Fp detected by the operating-force sensor 340 and a value Sp detected by the stroke sensor 232.

The pressurizing pistons 102, 104 are advanced by a force related to the hydraulic pressure in the rear chamber 310, so that hydraulic pressures are generated in the pressure chambers 110, 112. Since the advance of the intermediate piston 304 is inhibited, an operating force applied to the input piston 302 has no effect on the hydraulic pressure in the rear chamber 310.

It is noted that an area of the pressure receiving surface of the intermediate piston 304 which faces the rear chamber 310 is equal to an area of a pressure receiving surface of the intermediate piston 304 which faces the rear compartment chamber 313 located at a rear of the flange 311, inhibiting retraction of the intermediate piston 304 due to the hydraulic pressure in the rear chamber 310. This state is the power operating state.

In the event of a malfunction in the hydraulic brake system, the open state of the communication control valve 332 is established. The annular chamber 312 and the inner chamber 314 are fluidically coupled with the reservoir 122. Also, the supply of current to the pressure-buildup linear valve 200 and the pressure-reduction linear valve 202 is stopped, so that the rear chamber 310 is also fluidically coupled with the reservoir 122.

When the brake pedal 64 is operated, the input piston 302 is advanced and brought into contact with the intermediate piston 304. Also, the pressurizing pistons 102, 104 are advanced with the advance of the intermediate piston 304. A hydraulic pressure related to the brake operating force is produced in the pressure chambers 110, 112. This state is the manual operating state.

As in the embodiments 1-3, the presence or absence of the liquid leakage from at least one of the brake lines 250a, b is detected in the power operating state, and the presence or absence of the liquid leakage from at least one of the brake lines 250a, b can be detected without based on the hydraulic pressures in the brake lines 250a, b.

Also, since the movement of the intermediate piston 304 is inhibited in the power operating state, the detection of the presence or absence of the liquid leakage can be made more reliable.

Embodiment 5

Figure 13:
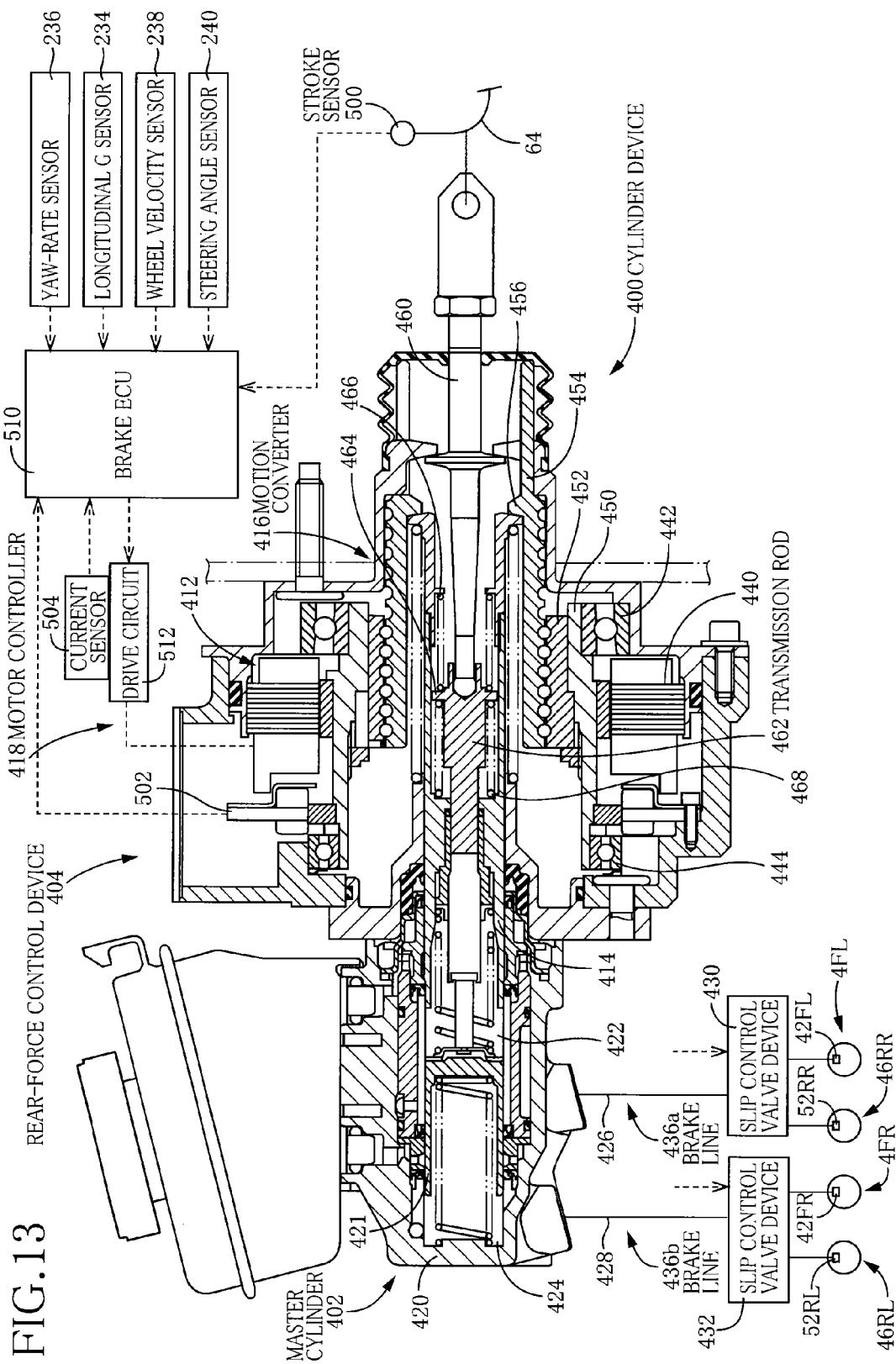
FIG. 13 is a view illustrating a hydraulic brake system including a hydraulic-pressure producing device according to an embodiment 5 of the present invention.

The present invention is applicable to a hydraulic brake system illustrated in FIG. 13.

<Structure of Hydraulic Brake System>

In the hydraulic brake system according to the present embodiment, a cylinder device 400 includes a master cylinder 402 and a rear-force control device 404, and the rear-force control device 404 includes (a) an electric motor 412, (b) a motion converter 416 configured to convert rotation of the electric motor 412 to a linear motion to transmit the output to a pressurizing piston 414, and (c) a motor controller 418 configured to control an operating state of the electric motor 412 to control the output to the pressurizing piston 414. The master cylinder 402 includes: the pressurizing piston 414 and a pressurizing piston 421 fluid-tightly and slidably fitted in a housing 420; and front chambers (pressure chambers) 422, 424 respectively provided in front of the pistons. The present hydraulic brake system uses the X configuration. The brake cylinders 42FL and 52RR provided respectively for the front left wheel 4FL and the rear right wheel 46RR are connected to the front chamber 422 via a liquid passage 426. The brake cylinders 42FR, 52RL provided respectively for the front right wheel 4FR and the rear left wheel 46RL are connected to the front chamber 424 via a liquid passage 428. A slip control valve device 430 including a plurality of electromagnetic valves is provided between the brake cylinders 42FL and 52RR and the front chamber 422. A slip control valve device 432 including a plurality of electromagnetic valves is provided between the brake cylinders 42FR, 52RL and the front chamber 424. A line including the front chamber 422, the liquid passage 426, and the brake cylinders 42FL, 52RR is a brake line 436a, and a line including the front chamber 424, the liquid passage 428, and the brake cylinders 42FR, 52RL is a brake line 436b.

The electric motor 412 includes: a stator 440 held by the housing 420 (strictly speaking that is independent of the housing 420 of the master cylinder 402 and immovable relative to the housing 420, and accordingly a whole housing will be referred to as "the housing 420"); and a rotor 450 having generally a cylindrical shape and held by the housing 420 via a pair of bearings 442, 444 such that the rotor is rotatable relative to the housing 420.

The motion converter 416 is provided on an inner circumferential side of the rotor 450. The motion converter 416 includes a ball screw mechanism and includes: a first cylindrical member 452 rotatable together with the rotor 450; and a second cylindrical member 454 engaged with the first cylindrical member 452 via balls and held by the housing 420 so as not to be rotatable relative to the housing 420. The second cylindrical member 454 extends in an axial direction of the cylinder device 400 and is engaged at its rear portion with the housing 420 so as not to be rotatable relative to each other. The second cylindrical member 454 can be engaged with the pressurizing piston 414 via an annular protruding portion 456 that is provided on an intermediate portion of the second cylindrical member 454 so as to project to the inner circumferential side.

The pressurizing piston 414 is shaped like a cylinder in which is provided a transmission rod 462 coupled with an operating rod 460. A flange 464 is provided on an intermediate portion of the transmission rod 462, and a pair of springs 466, 468 are provided between the flange 464 and the pressurizing piston 414. Thus, even when these springs 466, 468 change a position of the transmission rod 462 relative to the pressurizing piston 414, a reaction force is continuously applied to the brake pedal 64.

The stroke of the brake pedal 64 is detected by a stroke sensor 500. Since the transmission rod 462 is advanced with the operation of the brake pedal 64, the stroke of the brake pedal 64 corresponds to a stroke of the transmission rod 462.

Also, a rotation speed of the electric motor 412, the number of rotations, and the like are detected by a rotation sensor 502 (e.g., a resolver). The second cylindrical member 454 is advanced with the rotation of the electric motor 412, thereby advancing the pressurizing piston 414. A predetermined relationship is established between the number of rotations of the electric motor 412, a stroke of the second cylindrical member 454, and a stroke of the pressurizing piston 414. Accordingly, the stroke of the second cylindrical member 454 and the stroke of the pressurizing piston 414 can be detected by a value detected by the rotation sensor 502.

A magnitude of current flowing to the electric motor 412 is detected by a current sensor (a current meter) 504. An output of the electric motor 412 is transmitted to the pressurizing piston 414 via the motion converter 416 to assist an operating force applied to the brake pedal 64. A force applied to the pressurizing piston 414 (which corresponds to hydraulic pressure in the front chambers 422, 424) is received by the electric motor 412 and the driver. An assisting force applied to the pressurizing piston 414 is detected based on a value detected by the current sensor 504, i.e., the magnitude of the current flowing to the electric motor 412 (a load current).

Components connected to a brake ECU 510 constituted mainly by a computer include the stroke sensor 500, the rotation sensor 502, the current sensor 504, the wheel velocity sensor 238, the steering angle sensor 240, the yaw-rate sensor 236, and the longitudinal G sensor 234. Also, the electric motor 412 is connected to the brake ECU 510 via a drive circuit 512.

<Motor Control>

In the present embodiment, an operating state of the electric motor 412 is controlled such that a ratio between the stroke of the brake pedal 64 obtained based on a value detected by the stroke sensor 500 and the stroke of the pressurizing piston 414 which is obtained based on the number of rotations detected by the rotation sensor 502 is equal to a predetermined value. That is, the operating state of the electric motor 412 is controlled in the normal braking operation such that a rate of boosting is constant.

Figure 15:
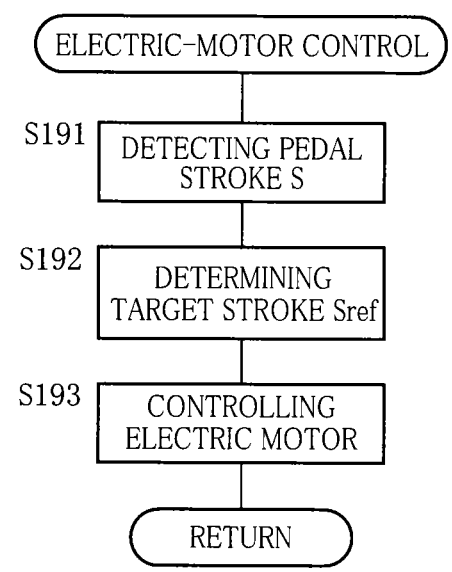
FIG. 15 is a flow chart illustrating a motor control program stored in the storage of the brake ECU.

One example of an electric-motor control program is illustrated in a flow chart in FIG. 15.

At S191, the stroke sensor 500 detects an angle of pivot of the brake pedal 64 from its retracted end position. At S192, a target value of the stroke (target stroke) Sref of the second cylindrical member 454 from its retracted end position is determined based on the value detected by the stroke sensor 500. At S193, the electric motor 412 is controlled such that an actual stroke gets closer to the target stroke Sref.

It is noted that when the rate of boosting is changed, the target stroke Sref is determined accordingly, and the electric motor 412 is controlled.

<Overview of Detection of Malfunction>

In the present embodiment, the number of rotations (i.e., the cumulative number of rotations) of the electric motor 412 from the retracted end position of the second cylindrical member 454 is detected based on the value detected by the rotation sensor 502. Based on this number of rotations, a stroke of the pressurizing piston 414 (i.e., the second cylindrical member 454) from its retracted end position is obtained.

Also, as described above, in the present embodiment, the electric motor 412 is controlled such that the ratio between the stroke of the brake pedal 64 and the stroke of the second cylindrical member 454 (corresponding to an operation amount of a rear-force apply device) is constant. Thus, an assisting force to be output is determined based on the stroke of the second cylindrical member 454, and the hydraulic pressure in the front chambers 422, 424 is obtained. Also, a magnitude of a load imposed on the electric motor 412 (i.e., the magnitude of the current flowing to the electric motor 412) can be estimated (an estimated current value I').

In a case where a value I detected by the current sensor 504 is lower than the estimated current value I', it is provisionally detected that no hydraulic pressure is generated in the front chambers 422, 424, and there is a liquid leakage from at least one of the brake lines 436a, b.

Based on a stroke of the second cylindrical member 454 at the point in time when the liquid leakage is detected provisionally, a position of the pressurizing piston 414 relative to the housing 420 is determined, and a remaining stroke required for one of the pressurizing pistons 414, 421 to be bottomed is determined. Also, a velocity of movement of the second cylindrical member 454 (i.e., a velocity of movement of the pressurizing piston 414) is determined based on a rotation speed (i.e., a rotational velocity) determined based on the value detected by the rotation sensor 502 at the point in time. Based on the velocity of movement and the remaining stroke, a length of time required for one of the pressurizing pistons 414, 421 to be bottomed is estimated (the estimated bottoming time).

As in the case in the embodiment 2, in a case where the velocity of movement of the second cylindrical member 454 is constant, the remaining stroke and the estimated bottoming time become shorter in a case where the cumulative number of rotations of the electric motor 412 at the point in time when the provisional liquid leakage is detected is large than in a case where the cumulative number of rotations of the electric motor 412 is small. In a case where the actual bottoming time and the estimated bottoming time is generally equal to each other, the liquid leakage is definitely detected.

<Executing Detection of Presence or Absence of Malfunction>

Figure 14:
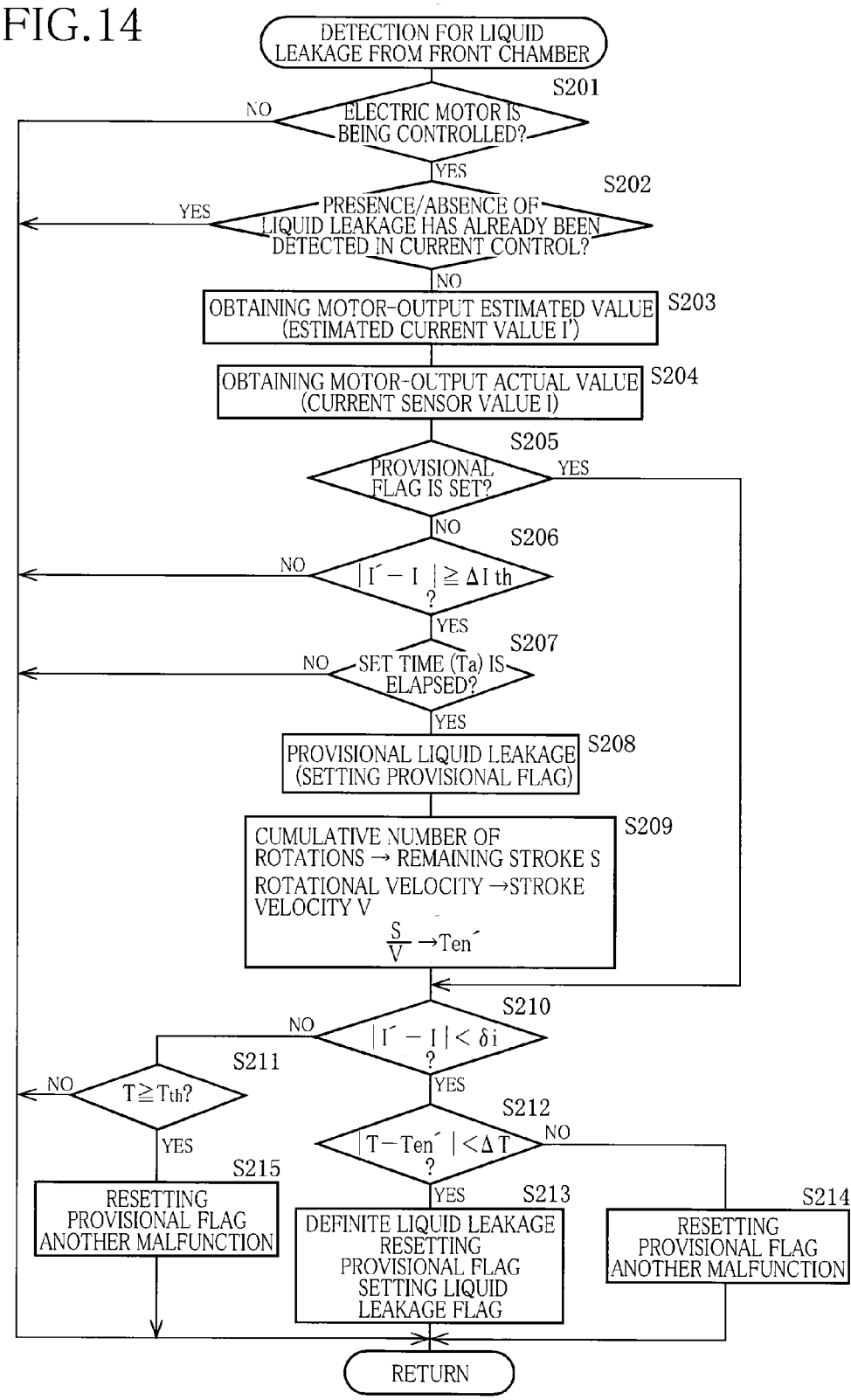
FIG. 14 is a flow chart illustrating a malfunction detection program stored in a storage of a brake ECU of the hydraulic brake system.

The malfunction detection program illustrated in the flow chart in FIG. 14 is executed each time when a predetermined set length of time is elapsed.

It is determined at S201 whether the electric motor 412 is being controlled or not. It is determined at S202 whether the presence or absence of the malfunction has already been detected in the current control or not. At S203, the value detected by the rotation sensor 502 is read, and the current value I' flowing to the electric motor 412 is estimated. At S204, the current value I actually flowing is detected by the current sensor 504. It is determined at S205 whether the provisional flag is in the set state or not. When the provisional flag is not in the set state, it is determined at S206 and S207 whether a state in which an absolute value of a difference between the estimated current value I' and the actual current value I is equal to or larger than a current-based second malfunction determination threshold value ΔIth (noted that while the second malfunction determination threshold value in the embodiment 2 is a threshold value with respect to the hydraulic pressure, the second malfunction determination threshold value in the present embodiment is a threshold value with respect to the current, and these threshold values are conceptually the same value) has continued for a time equal to or longer than the second malfunction determination time Ta or not. When positive decisions (YES) are made at S206 and S207, the provisional flag is set (ON) at S208.

At S209, the cumulative number of rotations from the retracted end position to the point in time when the provisional flag is set and the rotational velocity at the point in time when the provisional flag is set are obtained to obtain the estimated bottoming time Ten' based on them.

At S210, it is determined whether the absolute value of the difference between the estimated current value I' and the actual current value I becomes smaller than a return determination threshold value δi or not. At the first execution at S210, a negative decision (NO) is made, and it is determined at S211 whether the rear-system malfunction determination time Tth has passed or not. Before the rear-system malfunction determination time Tth has passed, the processings at S201-S205, S210, and S211 are repeated. When a positive decision (YES) is made at S210 before the rear-system malfunction determination time Tth has passed, it is determined at S212 whether the difference between the actual bottoming time T and the estimated bottoming time Ten' is smaller than the estimated validity determination value ΔT or not. When a positive decision (YES) is made at S212, it is determined at S213 that there is a definite liquid leakage. On the other hand, the difference between the actual bottoming time T and the estimated bottoming time Ten' is larger than the estimated validity determination value ΔT, another malfunction is detected at S214. When the rear-system malfunction determination time Tth has passed, it is determined at S215 that there is a malfunction in the rear-force control device 404.

It is noted that the estimated bottoming time can be obtained based on a value detected by the current sensor 504 at the timing when it is provisionally detected that there is a liquid leakage. It is possible to estimate that the pressurizing piston 414 is located at a fronter position in a case where the current value detected by the current sensor 504 is large than in a case where the current value detected by the current sensor 504 is small. Accordingly, by obtaining, in advance, a relationship between the current value I and a position of the pressurizing piston 414 relative to the housing 420, the remaining stroke of the pressurizing piston 414 can be obtained based on the current value at the point in time when the provisional liquid leakage is detected.

Also, in the hydraulic brake system illustrated in FIG. 13, the presence or absence of the malfunction can be detected in the same method as in the hydraulic brake system according to the embodiment 3. It is possible to identify one of the brake lines 436a, b which suffers from the liquid leakage, based on the difference in rotational velocity between the four wheels and the state of running of the vehicle. In this case, it only needs to determine whether the electric motor is being controlled or not at S131 of the malfunction-presence/absence detection program illustrated in the flow chart in FIG. 8, and the same processings as those at S132 and subsequent steps are executed.

In the present embodiment as described above, portions of the brake ECU 510 which store and execute the processings at S203-S208, and so on constitute the provisional liquid leakage detector. Portions of the brake ECU 510 which store and execute the processings at S209, S210, and S212, and so on constitute the definite liquid leakage detector. Portions of the brake ECU 510 which store and execute the processing at S209, and so on constitute the bottoming time estimator. The provisional liquid leakage detector, the definite liquid leakage detector, and so on constitute a motor-current-based detector. The drive circuit 512, portions of the brake ECU 510 which store and execute the motor control program, and so on constitute a motor controller.

While the plurality of embodiments have been explained above, these embodiments may be realized in combination. For example, the presence or absence of the liquid leakage can be detected based on two or more of a rate of change of the actual rear hydraulic pressure, the difference between the estimated bottoming time and the actual bottoming time, the wheel velocity difference, the yaw rate, and the deceleration.

In addition to the above-described embodiments, the present invention may be embodied with various changes and modifications, which may occur to those skilled in the art, for example, the present invention may be embodied with any structure of a hydraulic brake circuit.

DESCRIPTION OF REFERENCE NUMERALS

26: Inverter, 28: Drive Motor, 56: Brake ECU, 58: Hybrid ECU, 40, 50: Hydraulic Brake, 42, 52: Brake Cylinder, 54: Hydraulic-pressure Producing Device (Cylinder Device), 64: Brake Pedal, 66: Rear-hydraulic-pressure Control Device, 68: Cylinder, 124, 126: Slip Control Valve Device, 180: Rear Chamber, 186: Electric Power Drive Source, 188: Rear-hydraulic-pressure Control Valve Device, 200: Pressure-buildup Linear Valve, 204: Rear Hydraulic Sensor, 310: Rear Chamber, 400: Cylinder Device, 404: Rear-force Control Device, 412: Electric Motor, 416: Motion Converter, 418: Motor Controller, 414, 421: Pressurizing Piston, 500: Stroke Sensor, 502: Rotation Sensor, 504: Current Sensor, 510: Brake ECU, 512: Drive Circuit

The invention claimed is:

1. A hydraulic brake system comprising:
   a cylinder device provided in a vehicle and comprising (a) a housing, (b) at least one pressurizing piston fluid-tightly and slidably fitted in the housing, (c) at least one front chamber respectively provided in front of the at least one pressurizing piston, and (d) a rear-force control device operable by a supply of electric power and capable of controlling a rear force that is a driving force applied from a rear side, the rear-force control device being configured to apply the rear force to one pressurizing piston of the at least one pressurizing piston;
   a plurality of brake cylinders of a plurality of hydraulic brakes coupled to the at least one front chamber and provided respectively for a plurality of wheels of the vehicle, the plurality of brakes being configured to respectively restrain rotations of the plurality of wheels;
   a rear-force detection device configured to detect the rear force; and
   a liquid-leakage detection device comprising a difference-based detector configured to detect presence or absence of a liquid leakage from at least one line of at least one brake line comprising the at least one front chamber and at least one of the plurality of brake cylinders coupled to each of the at least one front chamber, the difference-based detector being configured to detect that there is a liquid leakage from the at least one line, when a state in which a subtraction value obtained by subtracting an actual rear force that is a value detected by the rear-force detection device from an estimated rear force that is an estimated value of the rear force is equal to or greater than a first malfunction determination threshold value had continued for a time equal to or greater than a first malfunction determination time, and thereafter the subtraction value has become equal to or less than a first return determination threshold value that is less than the first malfunction determination threshold value.

2. The hydraulic brake system according to claim 1, wherein the hydraulic brake system comprises a rear-force-control-device malfunction detector configured to detect that there is a malfunction in the rear-force control device, when a state in which the subtraction value obtained by subtracting the actual rear force from the estimated rear force is equal to or greater than the first malfunction determination threshold value has continued for a time equal to or greater than a rear-system malfunction determination time that is greater than the first malfunction determination time.

3. A hydraulic brake system comprising:
   a cylinder device provided in a vehicle and comprising (a) a housing, (b) at least one pressurizing piston fluid-tightly and slidably fitted in the housing, (c) at least one front chamber respectively provided in front of the at least one pressurizing piston, and (d) a rear-force control device operable by a supply of electric power and capable of controlling a rear force that is a driving force applied from a rear side, the rear-force control device being configured to apply the rear force to one pressurizing piston of the at least one pressurizing piston;
   a plurality of brake cylinders of a plurality of hydraulic brakes coupled to the at least one front chamber and provided respectively for a plurality of wheels of the vehicle, the plurality of brakes being configured to respectively restrain rotations of the plurality of wheels;
   a rear-force detection device configured to detect the rear force; and
   a liquid-leakage detection device comprising: (a) a provisional liquid leakage detector configured to provisionally detect that there is a liquid leakage from at least one line of at least one brake line comprising the at least one front chamber and at least one of the plurality of brake cylinders coupled to each of the at least one front chamber, when a subtraction value obtained by subtracting an actual rear force that is a value detected by the rear-force detection device from an estimated rear force that is an estimated value of the rear force is equal to or greater than a second malfunction determination threshold value, and (b) a definite liquid leakage detector configured to definitely detect that there is the liquid leakage, when an absolute value of a difference between an actual bottoming time and an estimated bottoming time is equal to or less than a predetermined estimated validity determination value, wherein the actual bottoming time is a length of time actually required from a point in time when the liquid leakage is provisionally detected by the provisional liquid leakage detector, to a point in time when the subtraction value obtained by subtracting the actual rear force from the estimated rear force becomes equal to or less than a second return determination threshold value that is less than the second malfunction determination threshold value, and wherein the estimated bottoming time is a length of time estimated based on at least a position of the one pressurizing piston relative to the housing at the point in time when the liquid leakage is provisionally detected by the provisional liquid leakage detector, and the estimated bottoming time is a length of time from the point in time when the liquid leakage is provisionally detected to a point in time when the subtraction value becomes equal to or less than the second return determination threshold value.

4. The hydraulic brake system according to claim 3, wherein the definite liquid leakage detector comprises a bottoming time estimator configured to determine the estimated bottoming time at a shorter time in a case where the actual rear force at the point in time when the liquid leakage is provisionally detected by the provisional liquid leakage detector is large than in a case where the actual rear force at the point in time when the liquid leakage is provisionally detected by the provisional liquid leakage detector is small.

5. The hydraulic brake system according to claim 1, wherein the liquid-leakage detection device comprises an operation-amount-based rear force estimator configured to obtain the estimated rear force based on an operation amount of the rear-force control device.

6. The hydraulic brake system according to claim 1, wherein the rear-force control device comprises a target-hydraulic-pressure-based controller configured to control the rear force such that the rear force is brought closer to a target rear force, and the liquid-leakage detection device comprises a target rear force estimator configured to obtain the target rear force as the estimated rear force.

7. The hydraulic brake system according to claim 1, wherein the rear-force control device comprises (a) a rear chamber provided at a rear of the one pressurizing piston, (b) a power hydraulic pressure source operable by a supply of electric power and capable of supplying a high hydraulic pressure, (c) at least one electromagnetic valve capable of controlling a hydraulic pressure in the rear chamber by utilizing the hydraulic pressure provided by the power hydraulic pressure source, and (d) an electromagnetic valve controller configured to control the at least one electromagnetic valve to bring the hydraulic pressure in the rear chamber closer to a target rear hydraulic pressure,
wherein the rear-force detection device comprises a rear-hydraulic-pressure detection device configured to detect the hydraulic pressure in the rear chamber, and
wherein the liquid-leakage detection device further comprises a rear-hydraulic-pressure-based detector configured to detect the presence or absence of the liquid leakage based on (i) an actual rear hydraulic pressure that is a value detected by the rear-hydraulic-pressure detection device as the actual rear force and (ii) the target rear hydraulic pressure as the estimated rear force.

8. The hydraulic brake system according to claim 7, wherein the cylinder device comprises (a) an input piston coupled to a brake operating member, (b) a transmission rod fitted in the one pressurizing piston immovably relative to the one pressurizing piston in an axial direction of the transmission rod, the transmission rod being engaged with the input piston movably relative to the input piston in the axial direction, and (c) a holder fixed between the one pressurizing piston and the input piston in the housing and configured to fluid-tightly and slidably hold the transmission rod, wherein the rear chamber is a hydraulic-pressure chamber located at a rear of the pressurizing piston and in front of the holder, and wherein the cylinder device is capable of taking: a power operating state in which the one pressurizing piston is advanced by the hydraulic pressure in the rear chamber in a state in which the input piston is allowed to move relative to the transmission rod; and a manual operating state in which the input piston is coupled to the one pressurizing piston via the transmission rod, and the one pressurizing piston is advanced by a brake operating force applied to the input piston, and
wherein the liquid-leakage detection device further comprises a power-operating-state detection start detector configured to start detecting the presence or absence of the liquid leakage in the power operating state.

9. The hydraulic brake system according to claim 7, wherein the cylinder device comprises (a) an input piston coupled to a brake operating member, and (b) an intermediate piston disposed at a rear of the rear chamber and comprising a pressure receiving surface, and wherein the cylinder device is capable of taking: a power operating state in which the one pressurizing piston is advanced by the hydraulic pressure in the rear chamber in a state in which the intermediate piston is inhibited from moving, and the input piston is allowed to move relative to the intermediate piston; and a manual operating state in which the input piston is coupled to the one pressurizing piston via the intermediate piston, and the one pressurizing piston is advanced by a brake operating force applied to the input piston, in a state in which the intermediate piston is allowed to move, and
wherein the liquid-leakage detection device further comprises a power-operating-state detector configured to detect the presence or absence of the liquid leakage in the power operating state.

10. The hydraulic brake system according to claim 1, wherein the rear-force control device comprises (a) an electric motor, (b) a motion converter device configured to convert rotation of the electric motor to linear motion to transmit the linear motion to the one pressurizing piston, and (c) a motor controller configured to control the rear force by controlling an operating state of the electric motor, to control a hydraulic pressure in the at least one front chamber,
wherein the rear-force detection device comprises a current detector configured to detect a current flowing to the electric motor, and
wherein the liquid-leakage detection device further comprises a motor-current-based detector configured to detect the presence or absence of the liquid leakage where the current detected by the current detector corresponds to the actual rear force and that a current flowing to the electric motor and estimated based on a rotation speed of the electric motor corresponds to the estimated rear force.

11. The hydraulic brake system according to claim 1, wherein the cylinder device comprises two front chambers as the at least one front chamber,
wherein (a) a line comprising: one front chamber of the two front chambers; and a first brake cylinder provided for a first wheel which is one of the plurality of wheels and which is coupled to the one front chamber is a first brake line, and (b) a line comprising: another front chamber of the two front chambers; and a second brake cylinder provided for a second wheel which is one of the plurality of wheels except the first wheel and which is coupled to said another front chamber is a second brake line, and wherein the liquid-leakage detection device further comprises a wheel-velocity-difference-based liquid leakage detector configured to detect presence or absence of a liquid leakage from at least one of the first brake line and the second brake line, based on at least one of a difference in rotational velocity between the first wheel and the second wheel and the a physical quantity indicative of the a state of running of the vehicle.

12. The hydraulic brake system according to claim 1, wherein the rear-force control device comprises a controller configured to control an actual rear force such that the actual rear force is brought closer to a target rear force, and wherein the liquid-leakage detection device further comprises a deceleration-based liquid leakage detector configured to detect that there is a liquid leakage from the at least one line, when a deceleration of the vehicle has decreased in a state in which the target rear force is constant.

13. The hydraulic brake system according to claim 1, wherein the liquid-leakage detection device further comprises a bottoming detector configured to detect bottoming of at least one of the at least one pressurizing piston based on at least one of a change in the actual rear force detected by the rear-force detection device and a difference between the actual rear force and an estimated rear force that is an estimated value of the rear force.

14. A hydraulic-pressure producing device comprising:

a cylinder device comprising (a) a housing, (b) at least one pressurizing piston fluid-tightly and slidably fitted in the housing, (c) at least one front chamber respectively provided in front of the at least one pressurizing piston, and (d) a rear-hydraulic-pressure control device comprising (i) a rear chamber provided at a rear of one of the at least one pressurizing piston and (ii) a power hydraulic pressure source operable by a supply of electric power and capable of producing a high hydraulic pressure, the rear-hydraulic-pressure control device being configured to control a hydraulic pressure in the rear chamber to bring the hydraulic pressure in the rear chamber closer to a target hydraulic pressure;

a rear-hydraulic-pressure detection device configured to detect the hydraulic pressure in the rear chamber; and a liquid-leakage detection device configured to detect a leakage of working liquid from at least one of the at least one front chamber not based on a hydraulic pressure in the at least one front chamber when an actual rear hydraulic pressure that is a value detected by the rear-hydraulic-pressure detection device has increased at a rate equal to or greater than a set rate, from a state in which the actual rear hydraulic pressure is less than the target hydraulic pressure by a value equal to or greater than a first set value.

* * * * *